March 19, 1963 P. C. SWARTZ 3,081,531
ELECTRON TUBE ASSEMBLY APPARATUS
Filed April 1, 1960 23 Sheets-Sheet 1
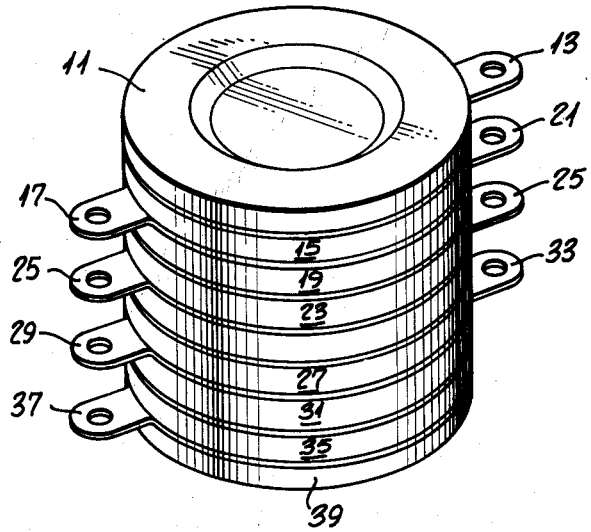
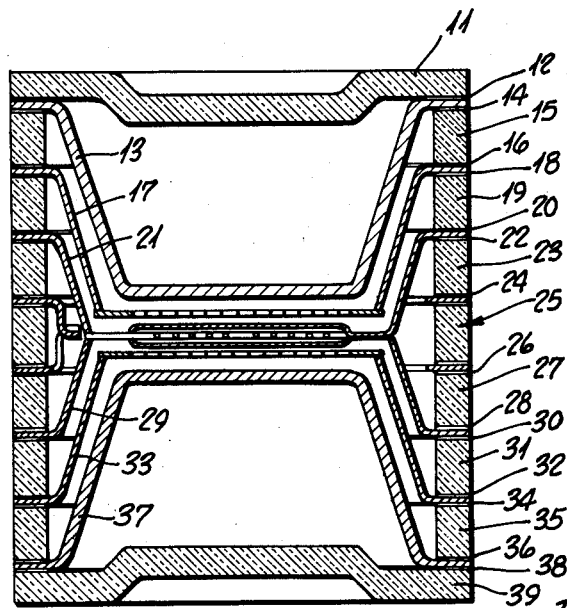
PAUL C. SWARTZ
INVENTOR.
BY
ATTORNEYS

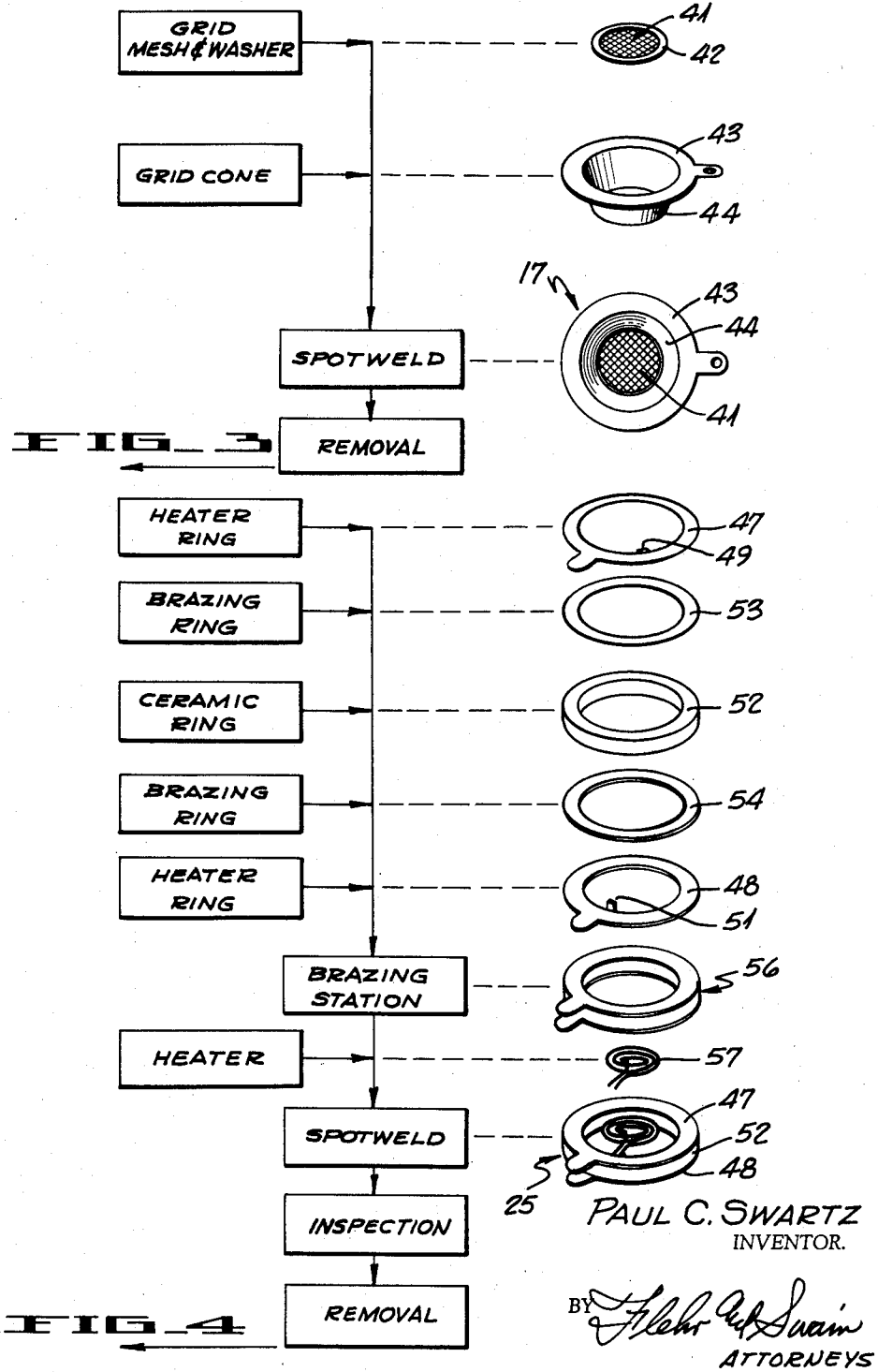

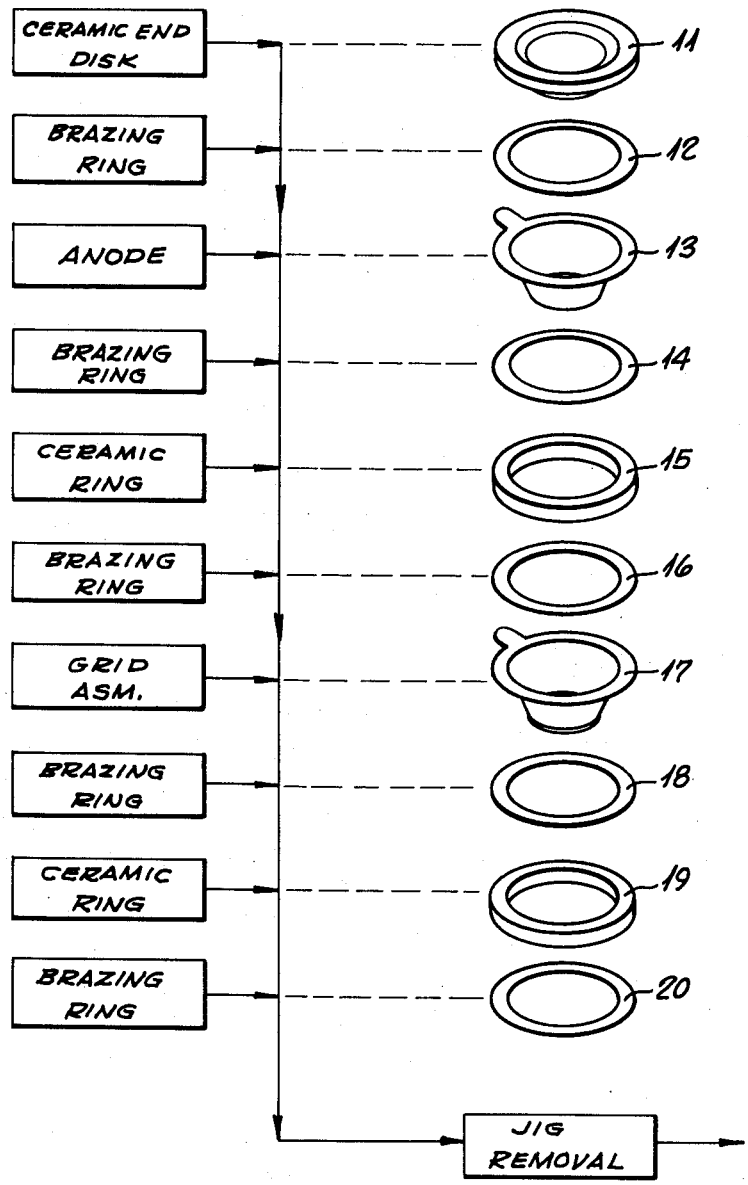

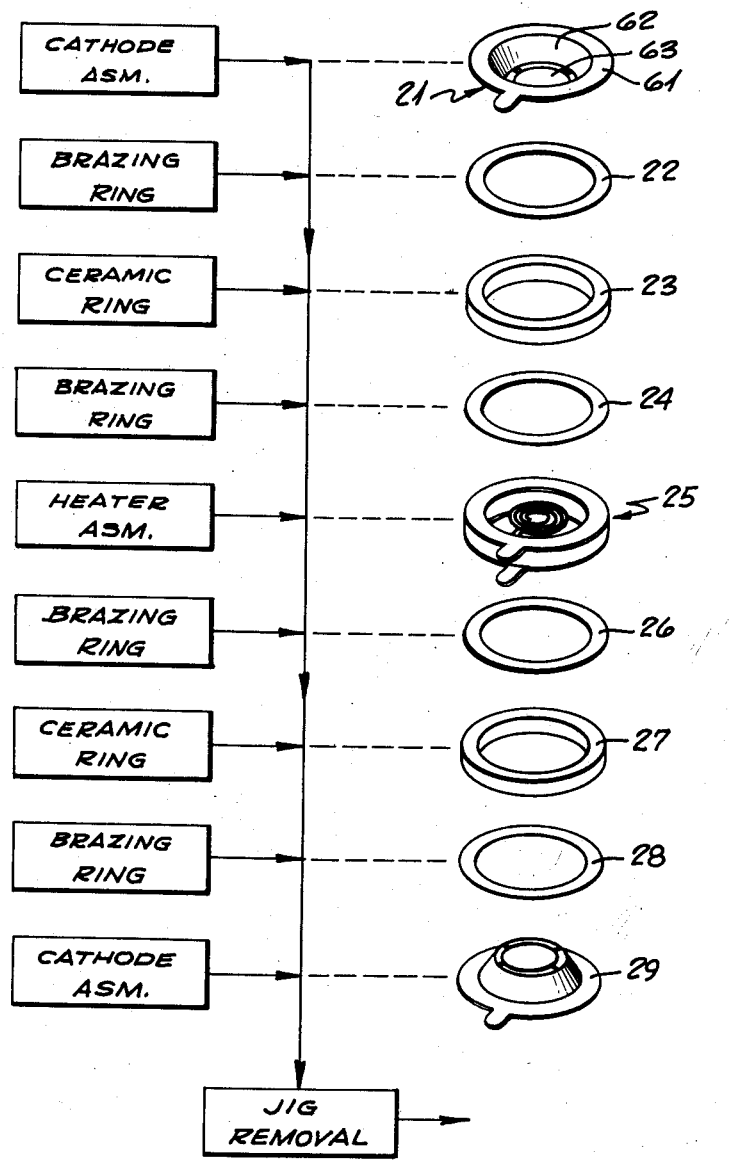
FIG_6

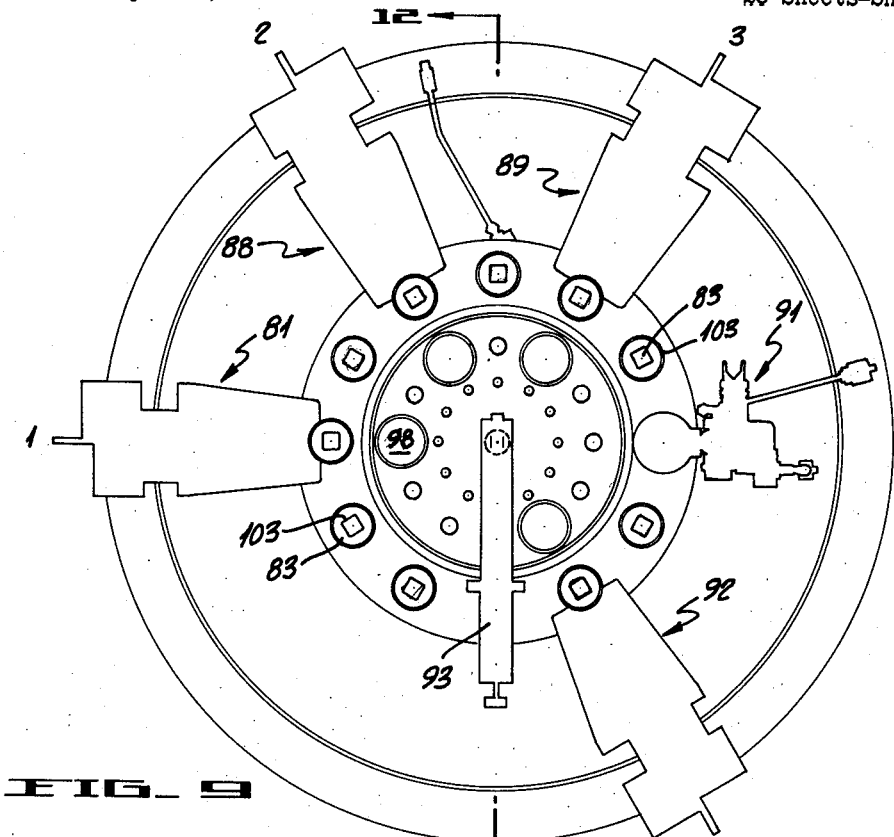
FIG_9
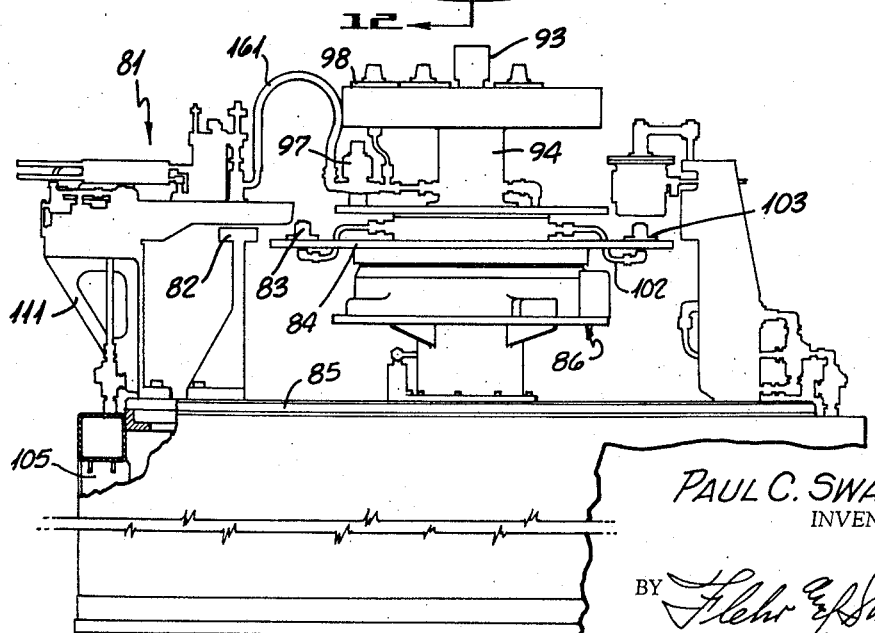
FIG_10
PAUL C. SWARTZ
INVENTOR.
BY
ATTORNEYS

March 19, 1963 P. C. SWARTZ 3,081,531
ELECTRON TUBE ASSEMBLY APPARATUS
Filed April 1, 1960 23 Sheets-Sheet 7
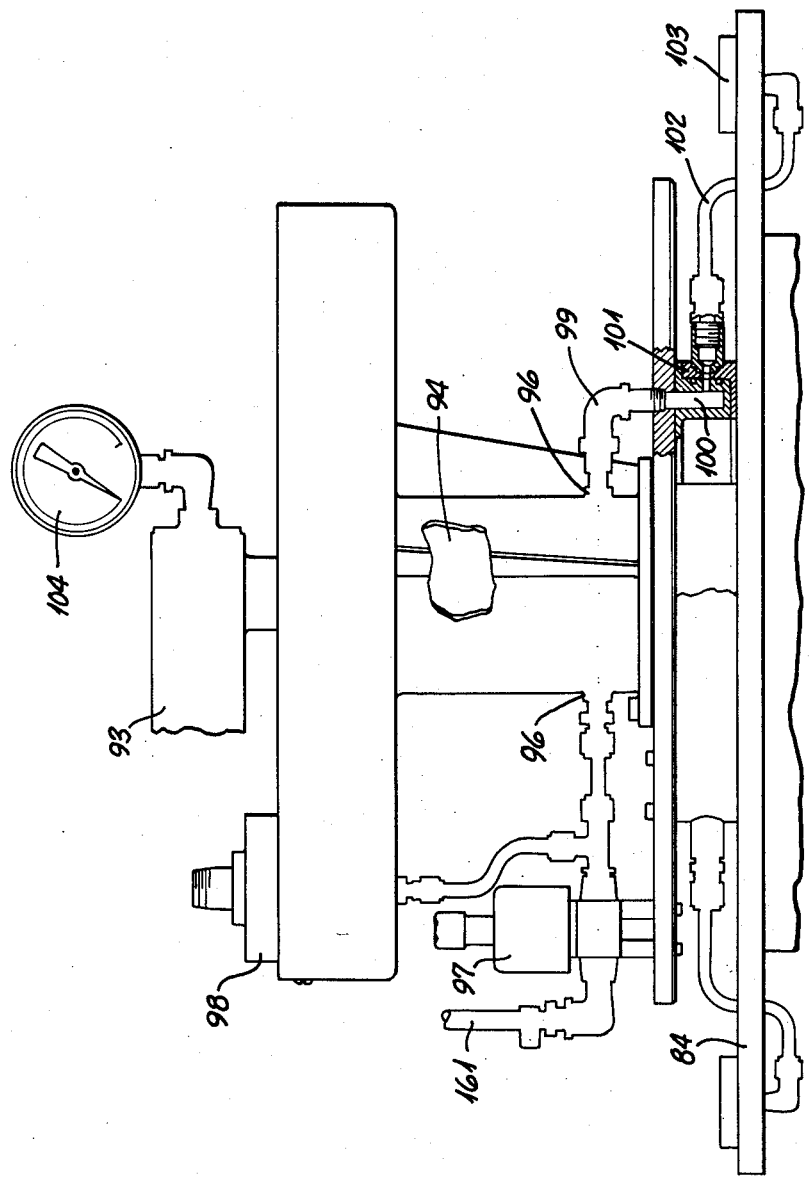
PAUL C. SWARTZ
INVENTOR.
BY
ATTORNEYS

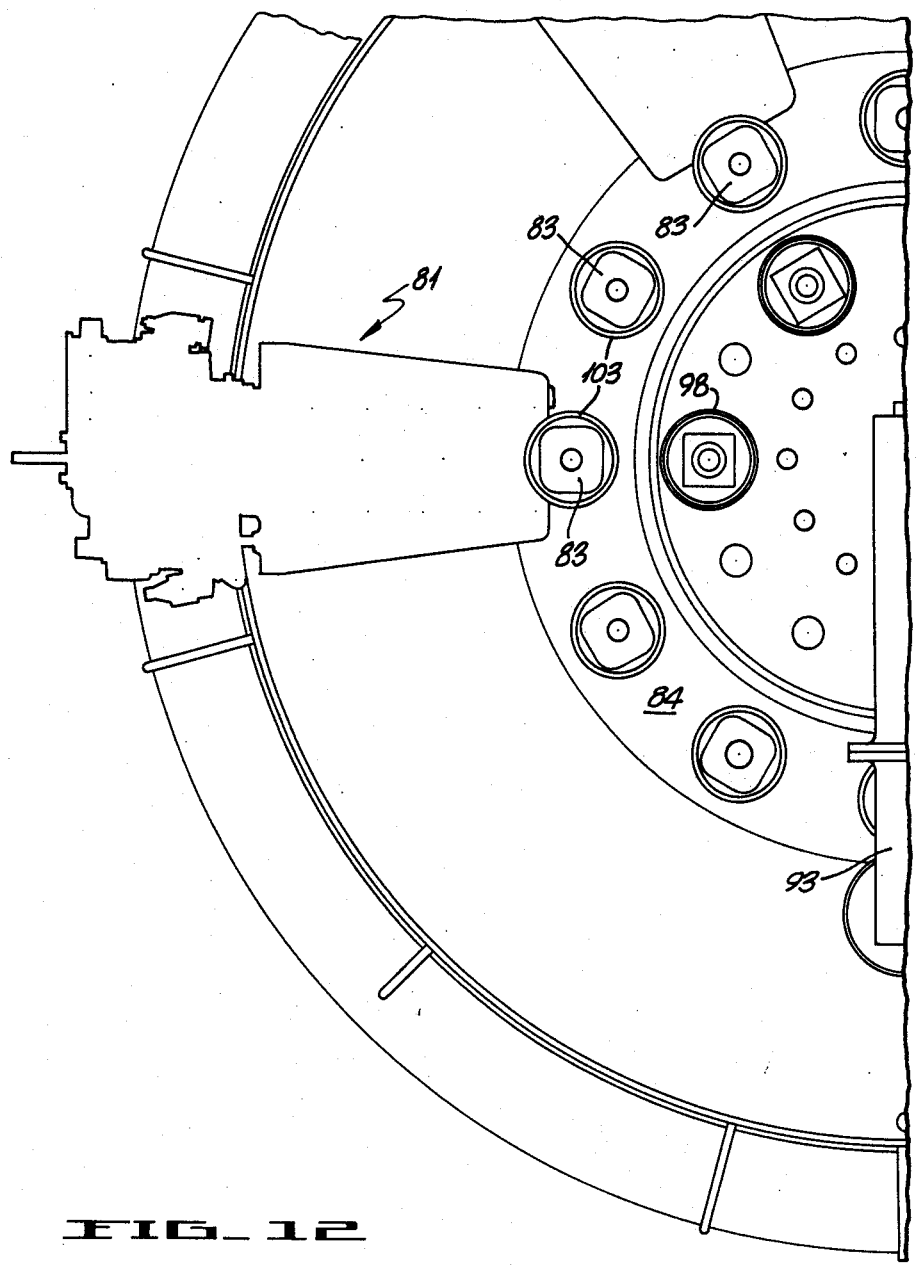

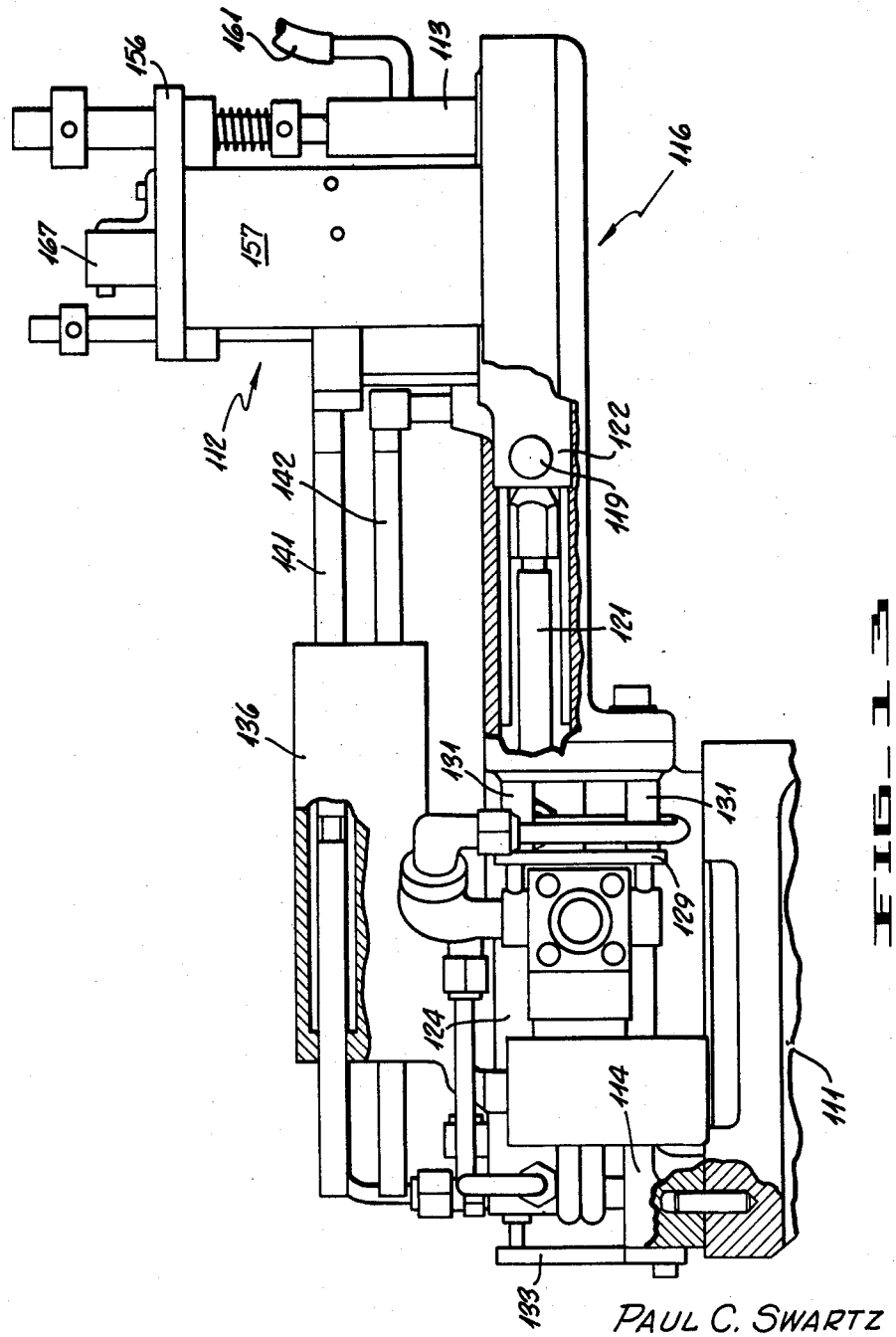

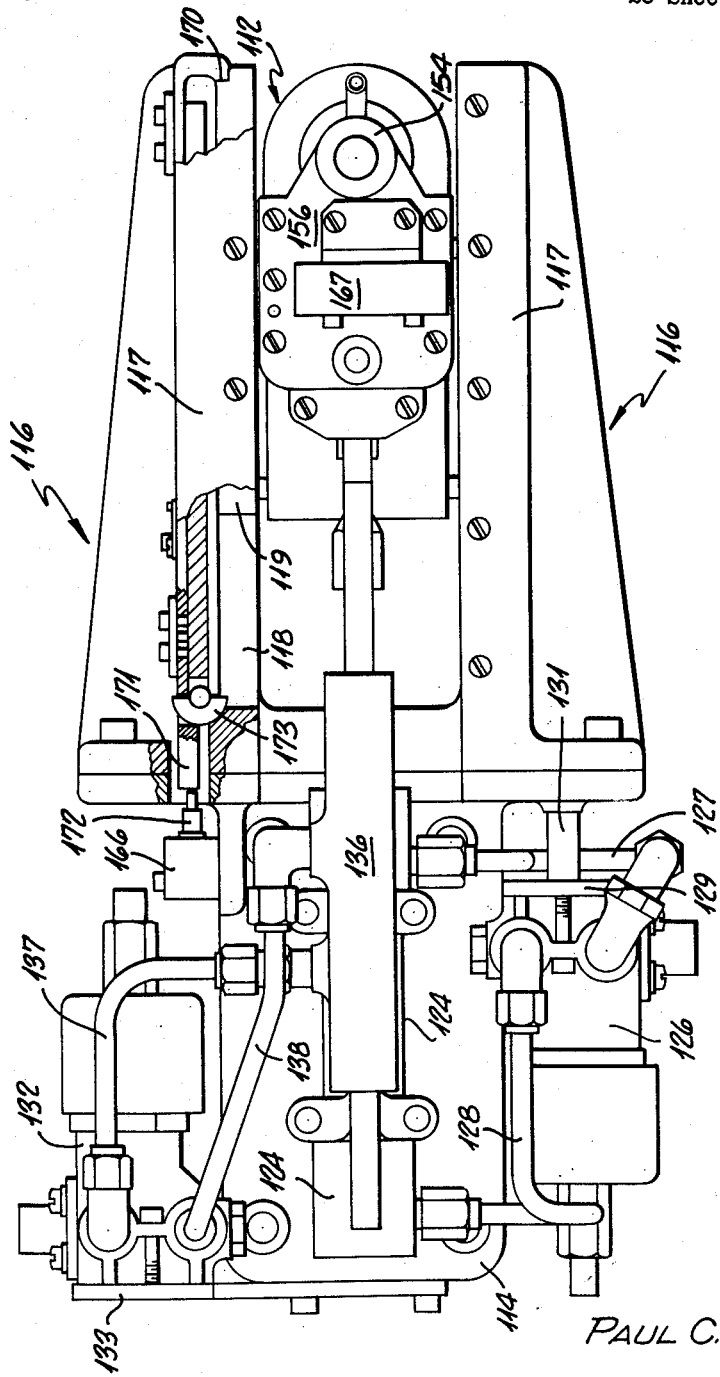

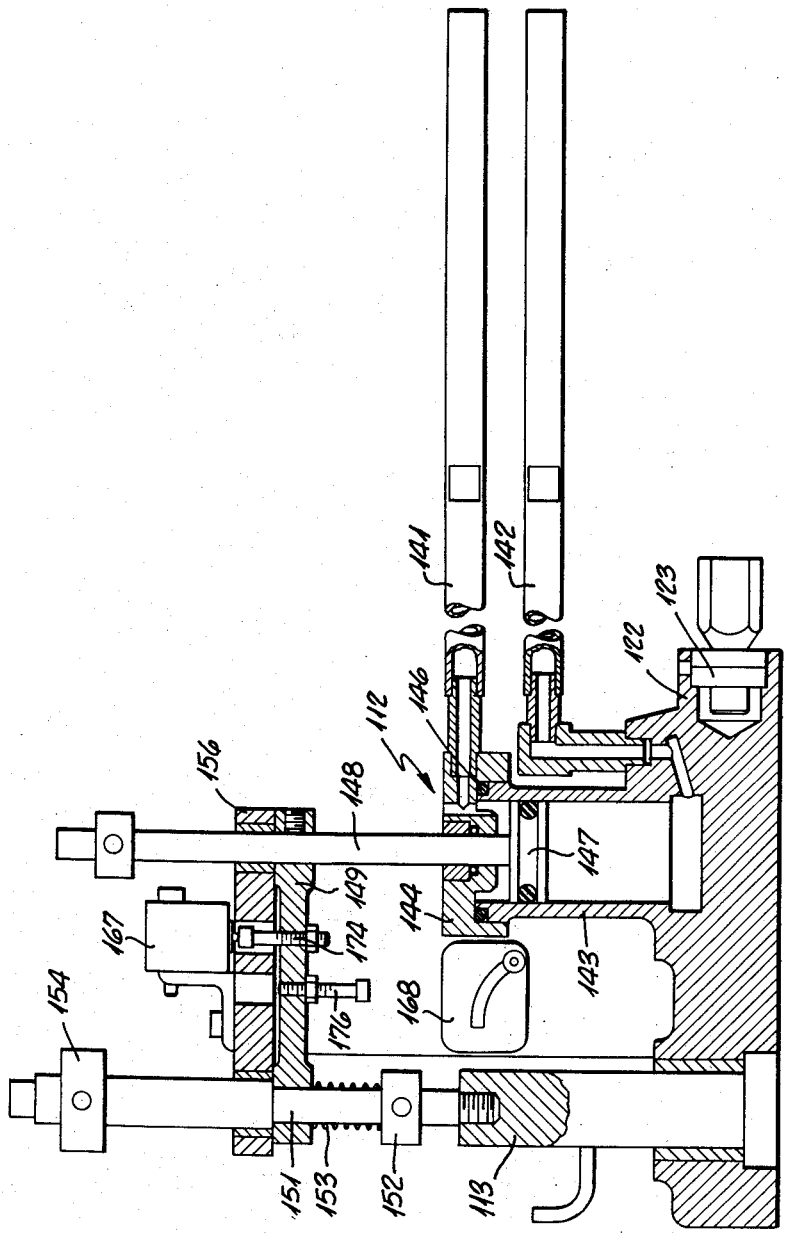

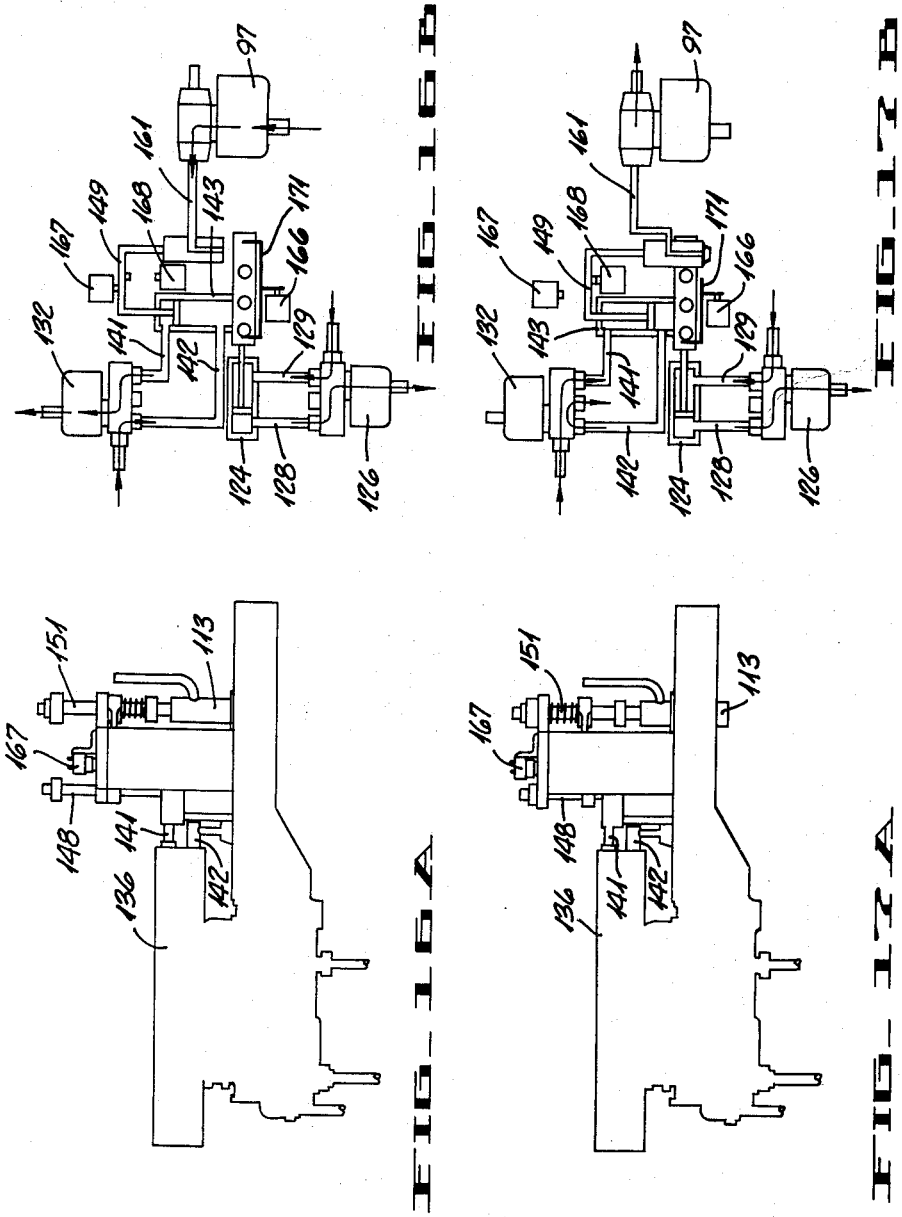

March 19, 1963
P. C. SWARTZ
3,081,531
ELECTRON TUBE ASSEMBLY APPARATUS
Filed April 1, 1960
23 Sheets-Sheet 13
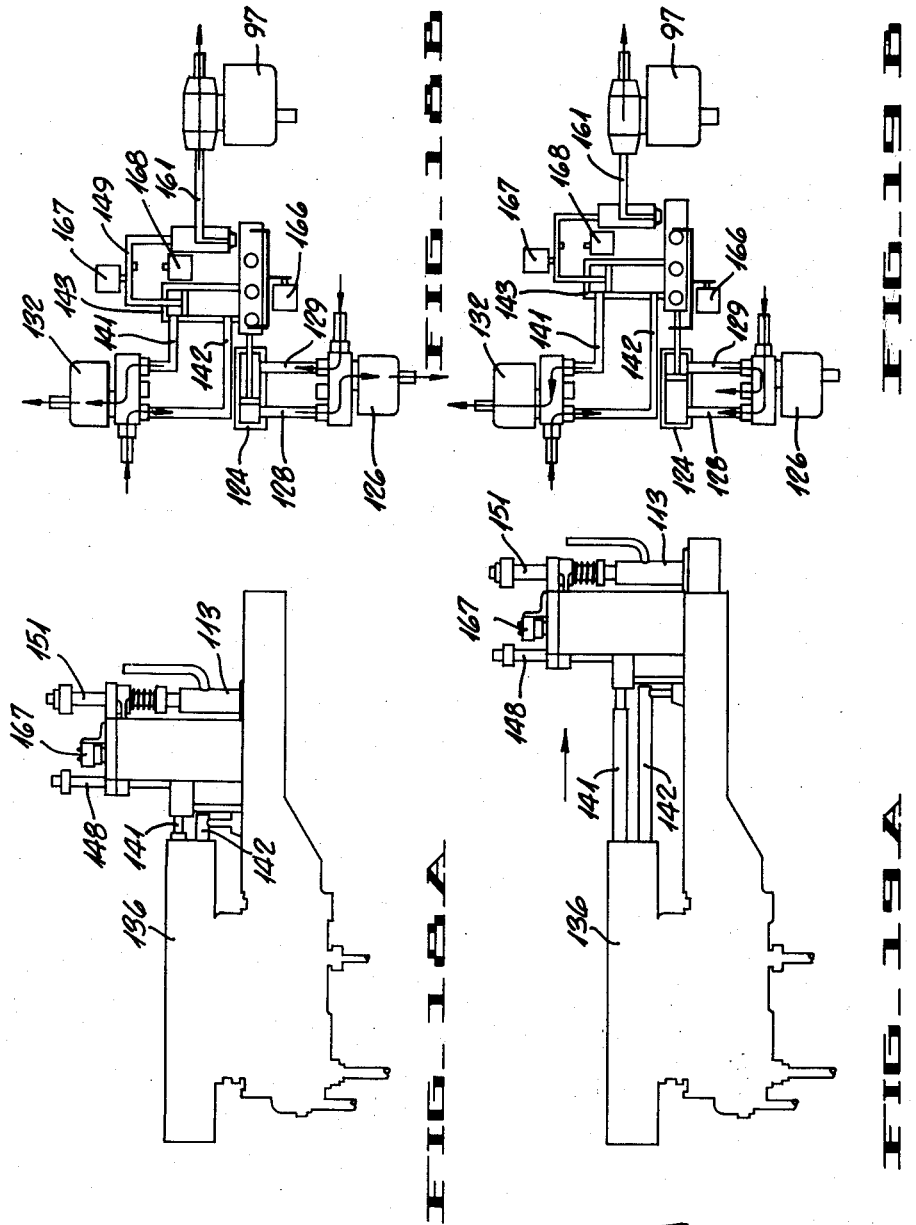
PAUL C. SWARTZ
INVENTOR.
ATTORNEYS March 19, 1963 P. C. SWARTZ 3,081,531
ELECTRON TUBE ASSEMBLY APPARATUS
Filed April 1, 1960 23 Sheets-Sheet 14
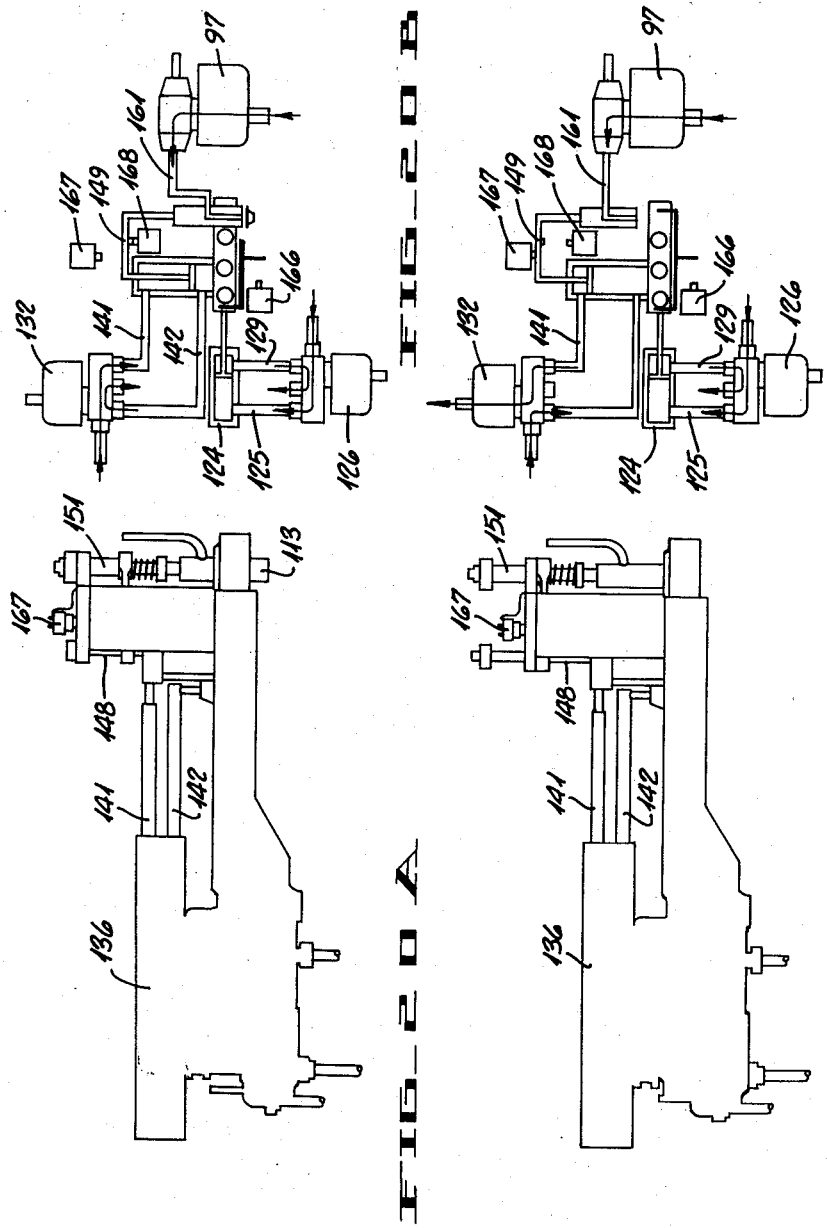
PAUL C. SWARTZ
INVENTOR.
BY
ATTORNEYS

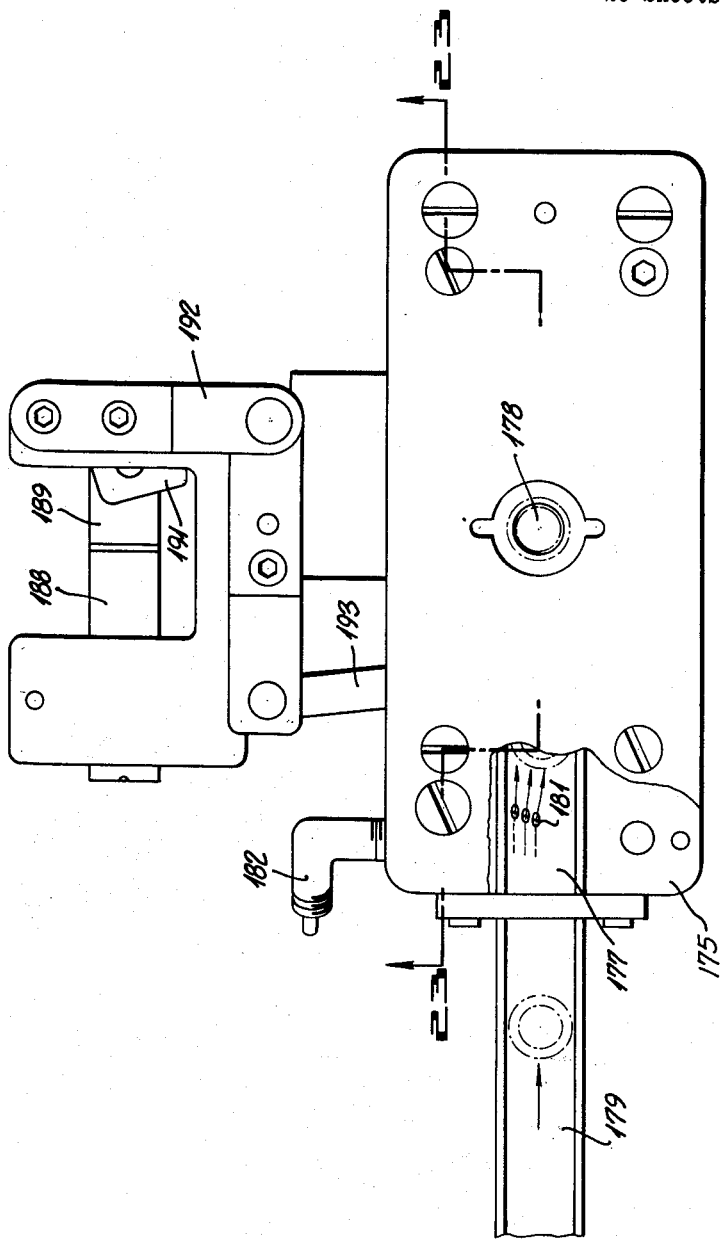

March 19, 1963  P. C. SWARTZ  3,081,531
ELECTRON TUBE ASSEMBLY APPARATUS
Filed April 1, 1960  23 Sheets-Sheet 16
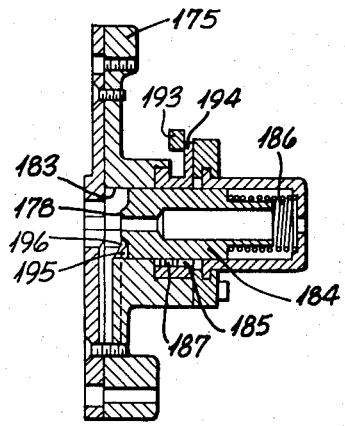
FIG_23
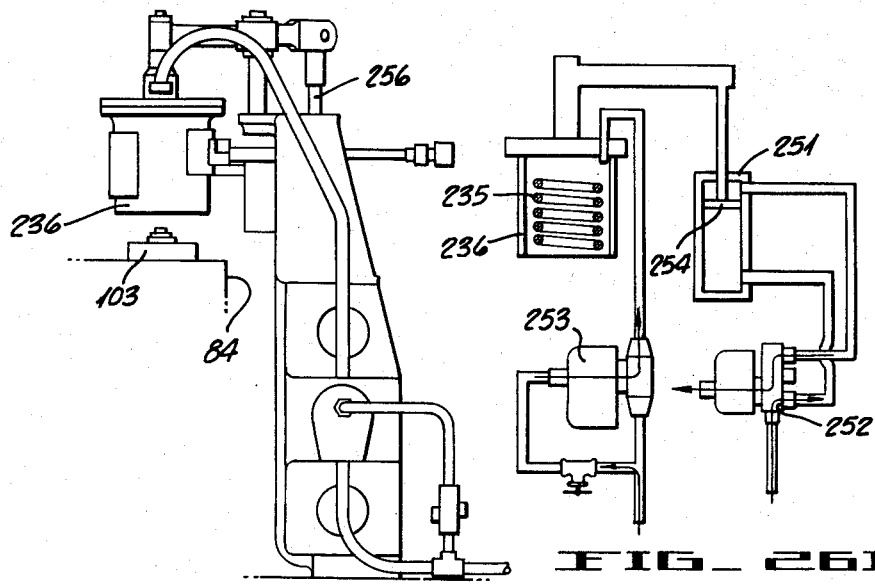
FIG_26A   FIG_26B
PAUL C. SWARTZ
INVENTOR.
BY
ATTORNEYS March 19, 1963 P. C. SWARTZ 3,081,531
ELECTRON TUBE ASSEMBLY APPARATUS
Filed April 1, 1960 23 Sheets-Sheet 17
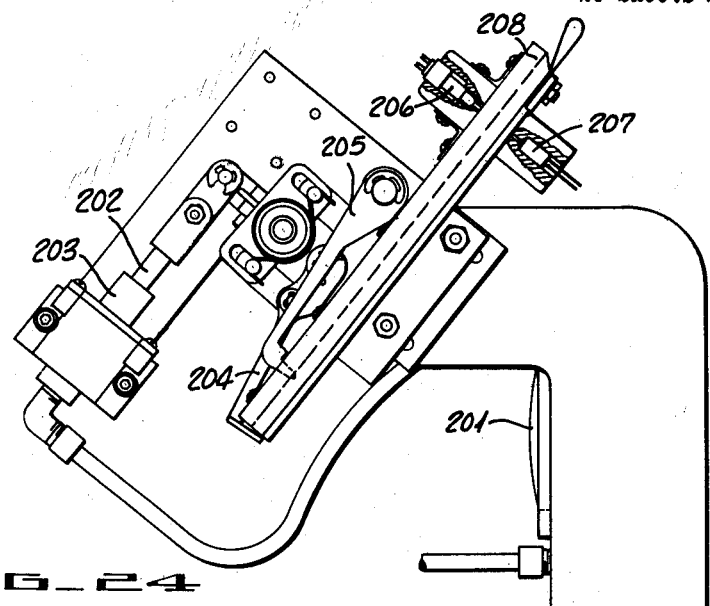
FIG_24
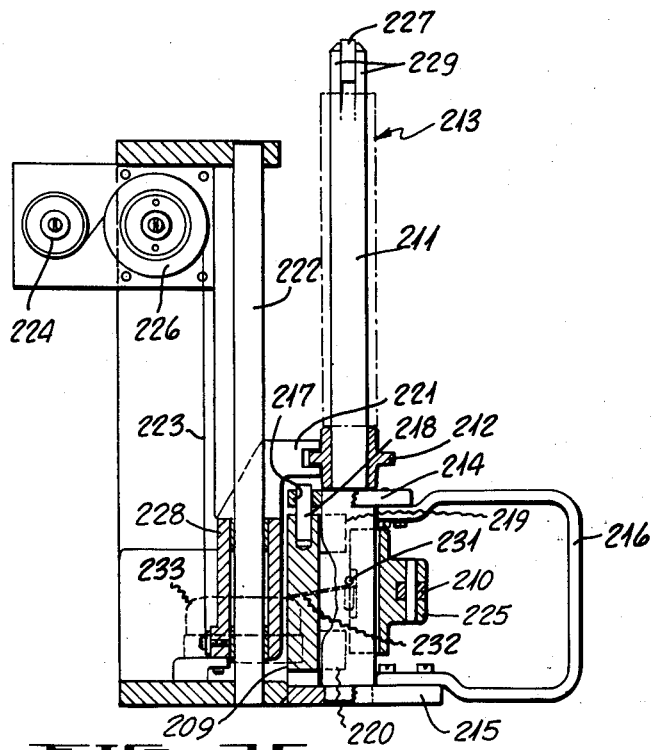
FIG_25
PAUL C. SWARTZ
INVENTOR.
BY
ATTORNEYS

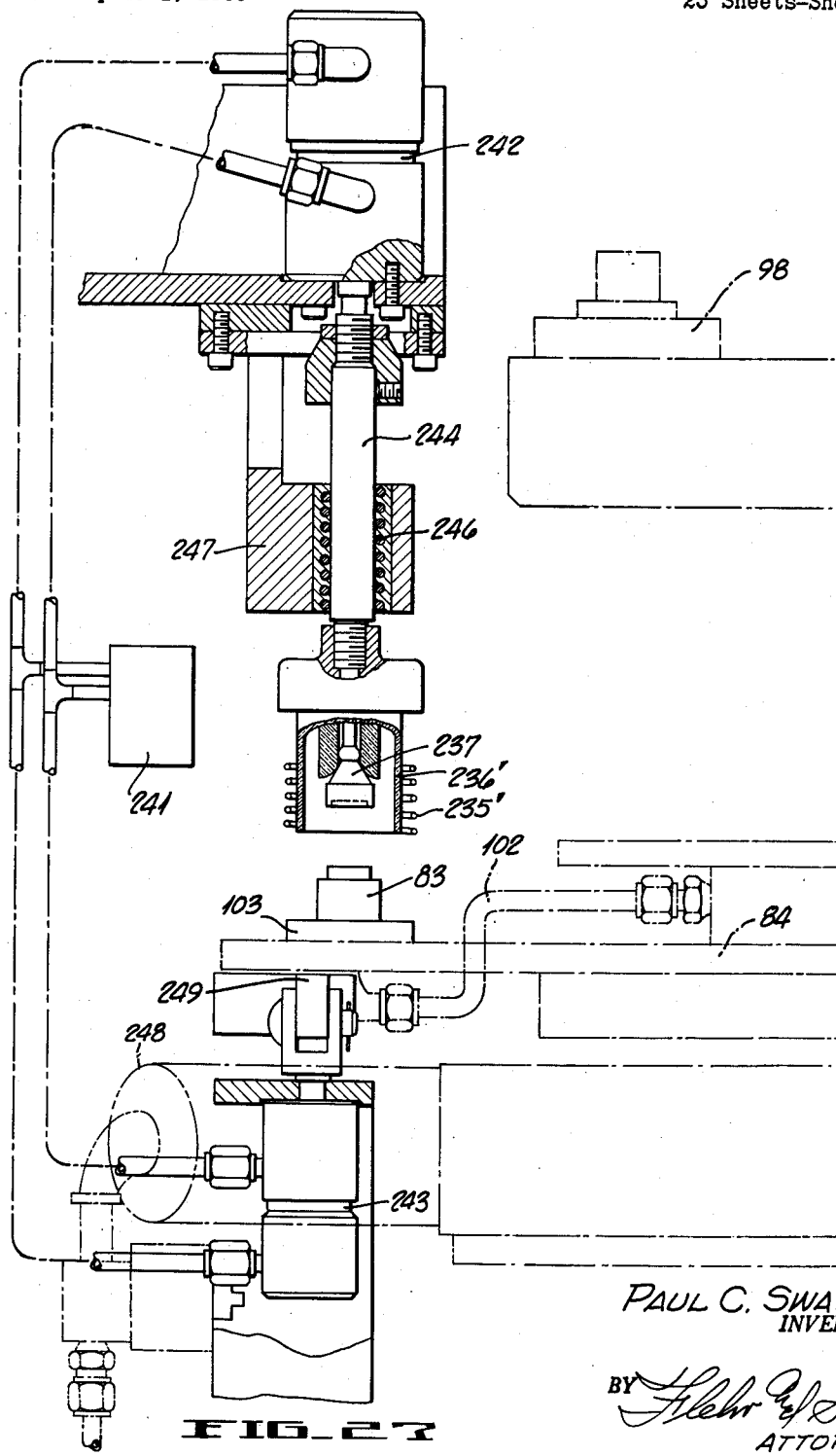

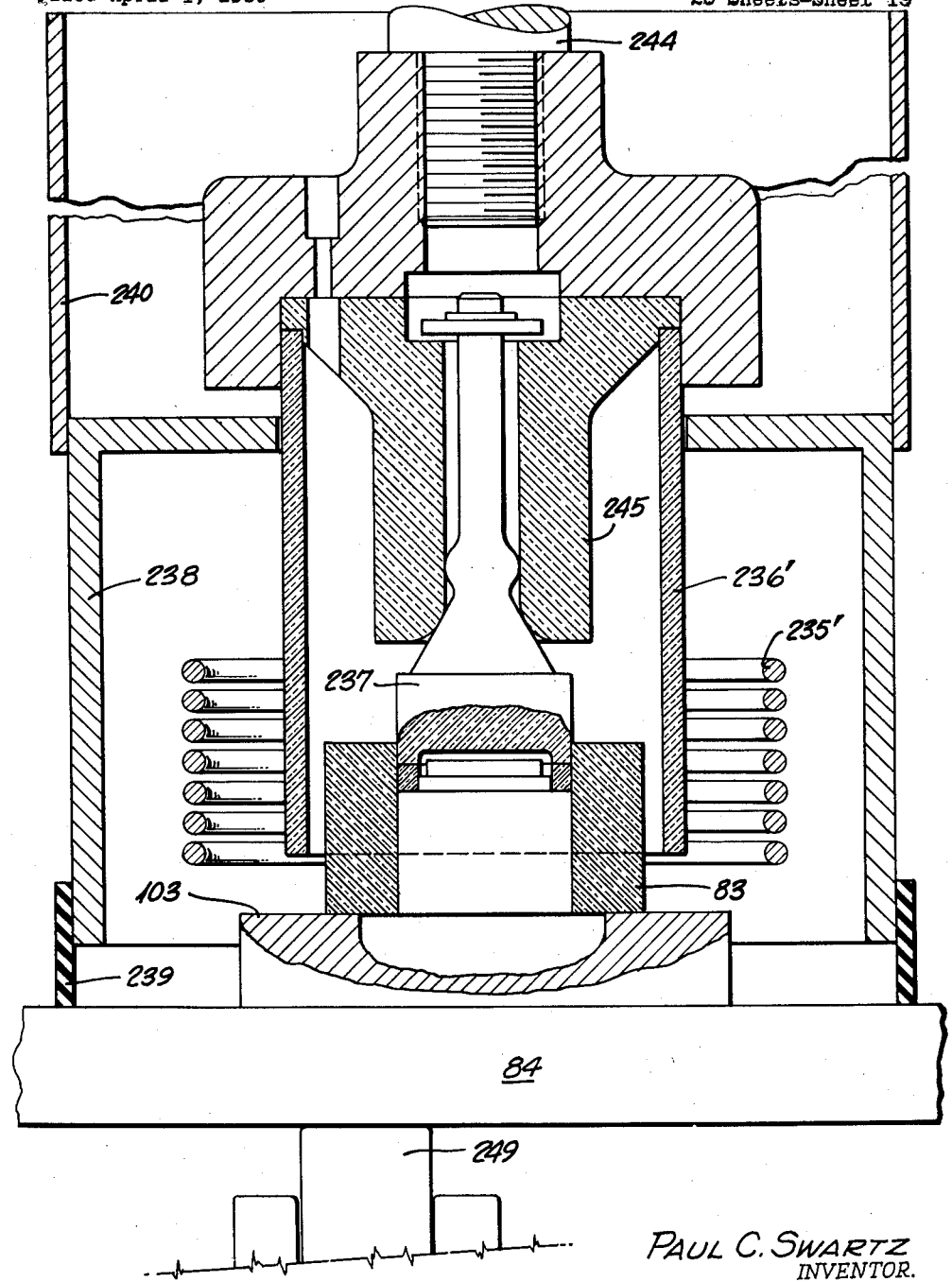
FIG_20

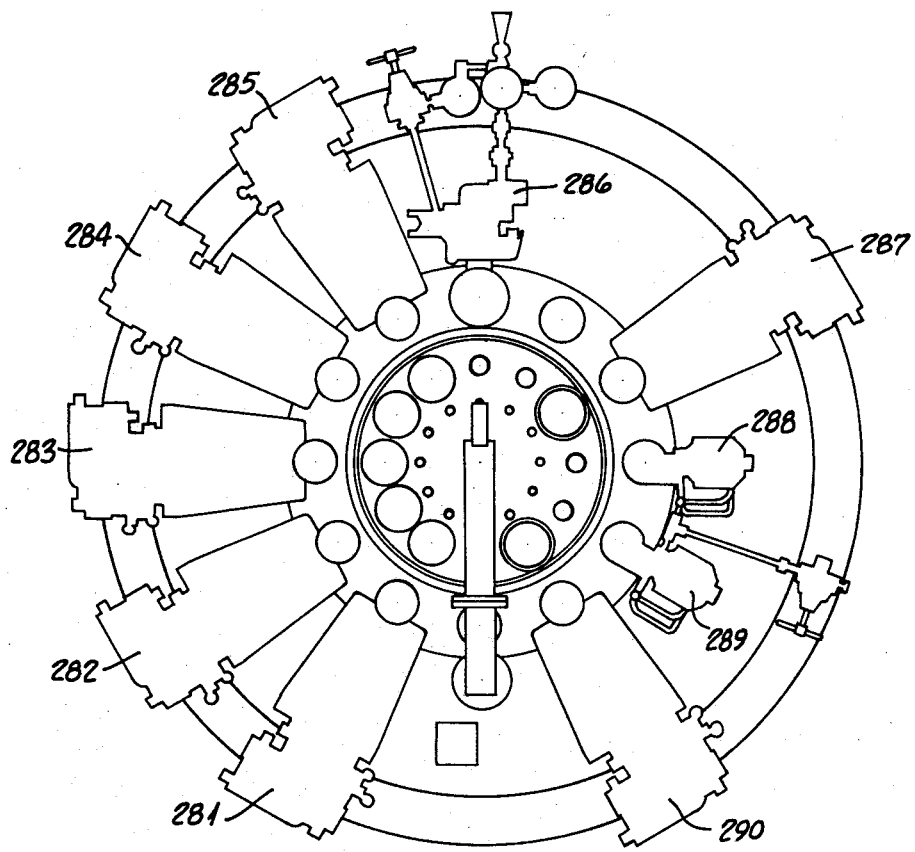
FIG_29
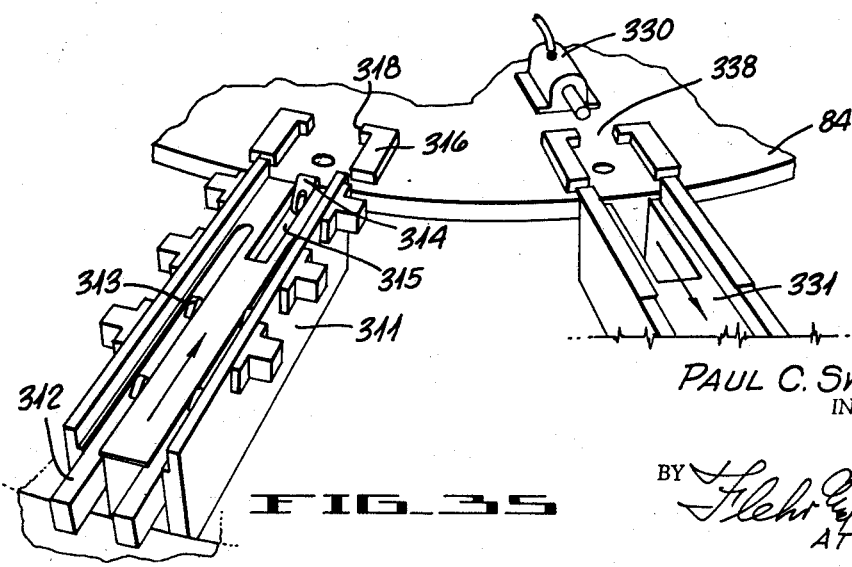
FIG_35
PAUL C. SWARTZ
INVENTOR.

March 19, 1963 P. C. SWARTZ 3,081,531
ELECTRON TUBE ASSEMBLY APPARATUS
Filed April 1, 1960 23 Sheets-Sheet 21
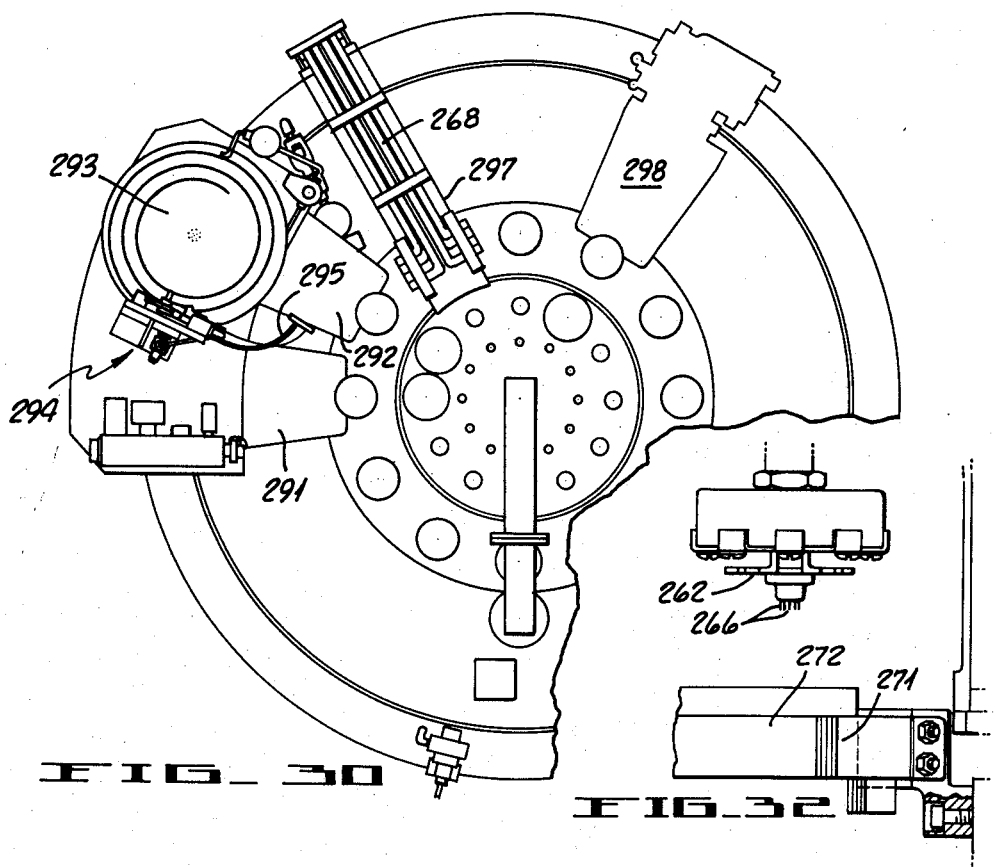
FIG_30
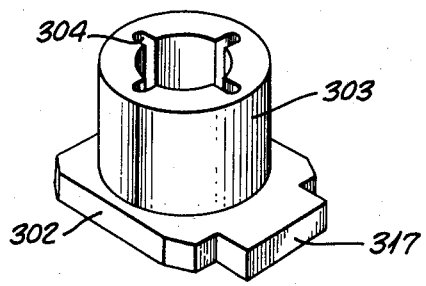
FIG_32
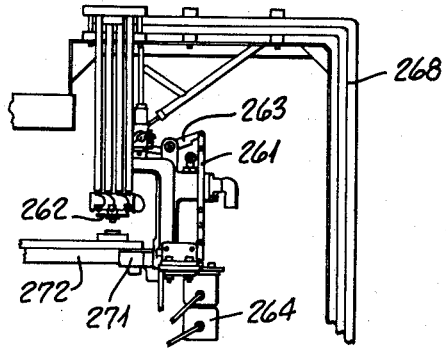
FIG_31
FIG_33
PAUL C. SWARTZ
INVENTOR.
BY
ATTORNEYS

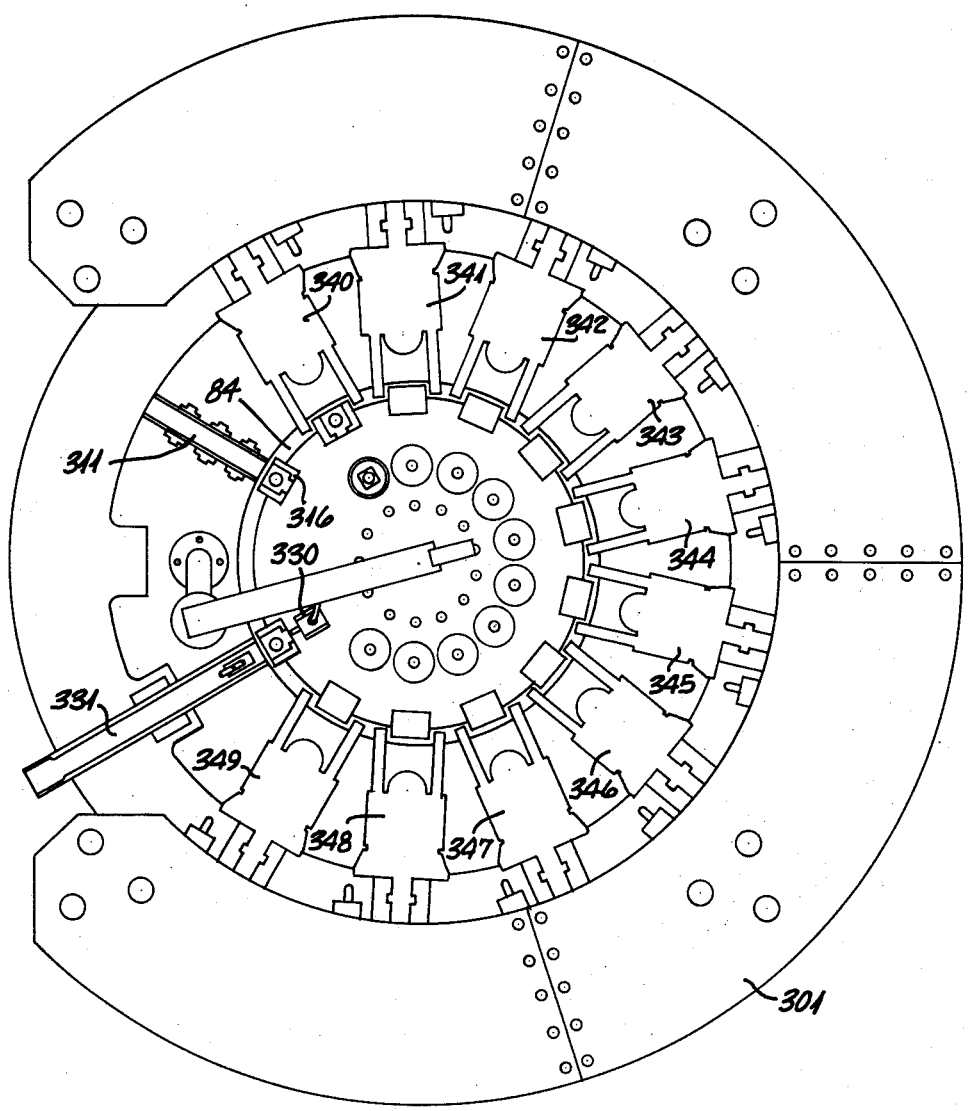

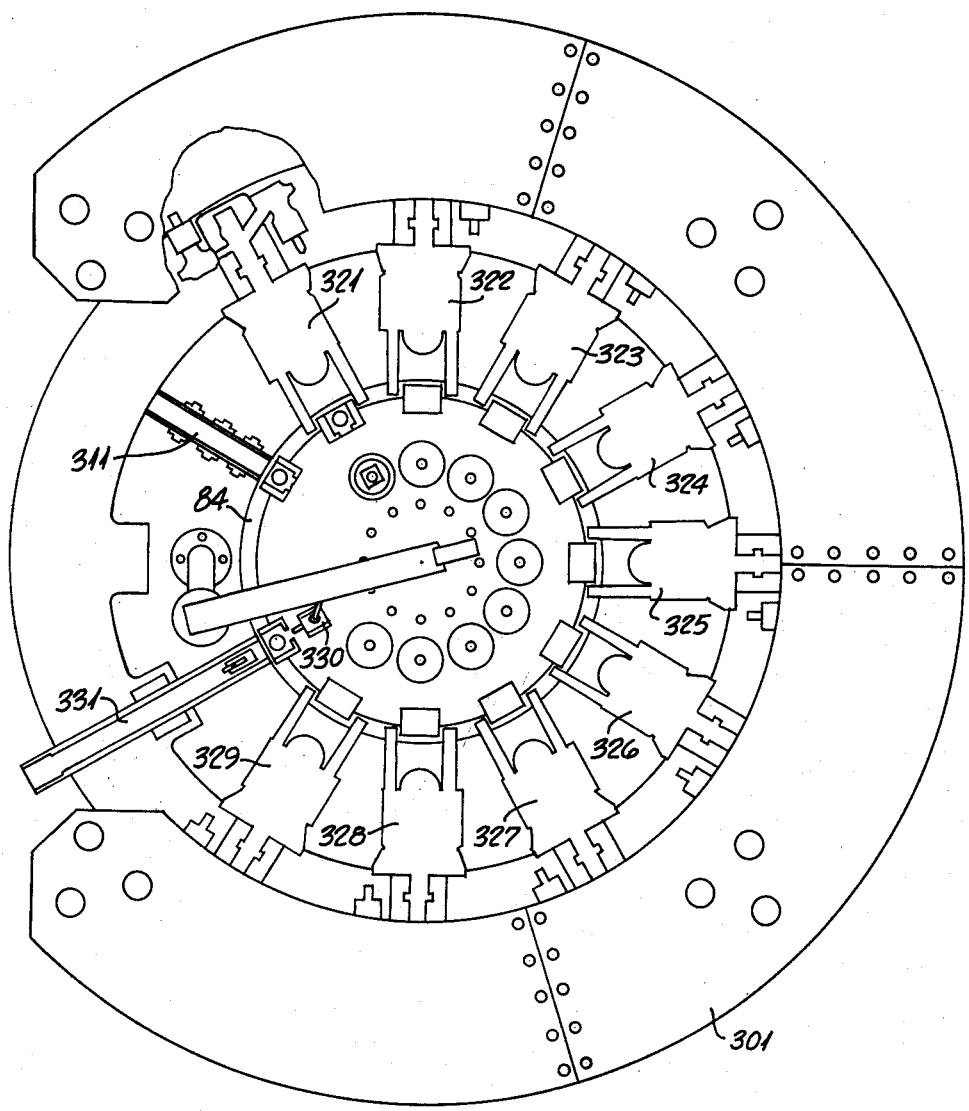
FIG_36

United States Patent Office 3,081,531
Patented Mar. 19, 1963

3,081,531
ELECTRON TUBE ASSEMBLY APPARATUS
Paul C. Swartz, San Carlos, Calif., assignor to Eitel-McCullough, Inc., San Carlos, Calif., a corporation of California
Filed Apr. 1, 1960, Ser. No. 19,245
11 Claims. (Cl. 29—203)

This invention relates generally to a processing and assembly apparatus, and more particularly to an electron tube processing and assembly apparatus and to stations therefor.

To meet the environmental and life requirements in many present day systems, rugged and reliable electron tubes are required. When an electron tube of a particular type is incorporated in a system, it is generally necessary that tubes of a like type be available in large quantity and that the characteristics of the tube be relatively uniform to permit replacement and duplication of design.

One type of tube construction which is rugged and reliable is a stacked ceramic tube in which tube elements and ceramic rings are stacked one on top of another and sealed together to form a vacuum-tight envelope containing the operating elements.

It is apparent that in order to achieve uniform characteristics, it is necessary that the various tube parts be accurately and identically positioned in each of the tubes, and that the parts in themselves have uniform dimensions and characteristics.

Generally in the prior art, vacuum tubes such as stacked ceramic tubes are manually assembled. That is, a jig or like is provided wherein the parts are manually inserted in the proper relationship for subsequent sealing. In manual operation of this type, variations in the placement of parts will occur. Not only will variations occur for a single assembler, but even greater variations may occur for different assemblers.

In order to obtain a large yield from a given assembly line which employs a large number of assemblers, it is necessary to set a relatively broad range for the specifications. On the other hand, if the tubes must come within relatively narrow specifications, a large percentage of the assembled tubes will be rejected.

As pointed out above, in many present day applications, it is not only desirable to provide tubes having uniform characteristics but to have readily available a large supply of such tubes. Manual assembly as described above is limited in speed. In order to turn out a greater number of tubes, it becomes necessary to employ a large number of people on the assembly line. This, in turn, leads to increased difficulty in obtaining the desired specifications with minimum rejection.

It is apparent that there is a need for a machine which automatically assembles and processes the electron tube so that tubes produced will have relatively uniform characteristics, which characteristics can be within limits to provide tubes which have specifications which lie within a narrow range. Automatic apparatus of the foregoing type can be operated at a substantially faster rate to produce tubes in large quantities.

One difficulty which may be encountered with automatic apparatus is that it will not operate satisfactorily if there are substantial variations in tube parts. A manual operator can reject the part, whereas a machine will accept the part and either jam or form a tube which does not come within the specifications.

It is a general object of the present invention to provide an electron tube assembly and processing apparatus.

It is another object of the present invention to provide a multi-station electron tube processing and assembly apparatus which serves to accurately position and assemble small fragile tube parts.

It is still a further object of the present invention to provide an apparatus for accurately transferring and positioning small parts such as vacuum tube parts.

It is a further object of the present invention to provide an apparatus suitable for automatically stacking ceramic rings and vacuum tube elements in a stacked relationship.

It is another object of the present invention to provide novel stations for a multi-station tube processing apparatus.

It is still a further object of the present invention to provide a novel transfer head for picking up, transferring, and accurately positioning small parts.

These and other objects of the invention are achieved by an apparatus which includes a plurality of stations and means for moving and presenting assembly jigs sequentially to each of the stations whereby a predetermined sequence of operations is performed. Some of the stations may include transfer heads which pick up parts from a nest and accurately position the parts into a jig presented thereto. Feed means cooperate with the nests to feed parts thereto as they are removed by the transfer head. Others of the stations to which the jigs are presented may perform such operations as spot welding, brazing, and inspection. Stations may also be provided for unloading an assembly from the jig or for removing a jig containing assembled parts.

The following description and drawing will provide a better understanding of the invention as well as a realization of other objects.

Referring to the drawing:

FIGURE 1 is a perspective view of a typical stacked ceramic tube which may be assembled by apparatus in accordance with the invention;

FIGURE 2 is a sectional view of the tube of FIGURE 1 showing the arrangement of the internal parts;

FIGURE 3 shows the steps in forming a grid assembly for a tube of the type shown in FIGURES 1 and 2;

FIGURE 4 shows the steps in forming a heater assembly for a tube of the type shown in FIGURES 1 and 2;

FIGURE 5 shows the steps in forming a grid anode assembly for a tube of the type shown in FIGURES 1 and 2;

FIGURE 6 shows the steps in forming a heater cathode assembly for a tube of the type shown in FIGURES 1 and 2;

FIGURE 9 is a top elevational view showing apparatus suitable for carrying out the operation as shown in FIGURE 8, certain of the parts being shown in outline for clarity;

FIGURE 10 is a side elevational view of the apparatus shown in FIGURE 9 showing two stations;

FIGURE 11 is an enlarged elevational view of the upper part of the machine shown in FIGURES 9 and 10;

FIGURE 12 is a partial enlarged view taken along line 12—12 of FIGURE 9;

FIGURE 13 is a side elevational view of a transfer head;

FIGURE 14 is a plan view of a transfer head;

FIGURE 15 is a back elevational view partly in section of a sub-assembly of the transfer head shown in FIGURES 13 and 14;

FIGURE 16A shows in outline the transfer head in its starting position ready to pick up a part, and FIGURE 16B schematically shows the operation;

FIGURE 17A shows in outline the transfer head picking up a part, and FIGURE 17B schematically shows the operation;

FIGURE 18A shows in outline the transfer head as it picks up a part, and FIGURE 18B schematically shows the operation;

FIGURE 19A shows in outline the transfer head transferring a part for assembly, and FIGURE 19B schematically shows the operation;

FIGURE 20A shows in outline the transfer head placing the part, and FIGURE 20B schematically shows the operation;

FIGURE 21A shows in outline the transfer head retracting and returning to the starting position, and FIGURE 21B schematically shows the operation;

FIGURE 22 is a plan view of a pick-up nest;

FIGURE 23 is a sectional view taken along the line 23—23 of FIGURE 22;

FIGURE 24 is a side elevational view of a parts feed mechanism employed to feed parts to the nest;

FIGURE 25 is an elevational view, partly in section, of a braze ring feed device;

FIGURE 26A is a side elevational view of a brazing station, and FIGURE 26B schematically shows the operation;

FIGURE 27 is a side elevational view, partly in section, of a pressure brazing station;

FIGURE 28 is an enlarged view in section of a brazing head;

FIGURE 29 is a plan view of a heater assembly apparatus with the various stations shown in outline;

FIGURE 30 is a plan view of a grid assembly apparatus with the stations of one grid assembly shown in outline;

FIGURE 31 shows a heavy duty spot welding station;

FIGURE 32 is an enlarged view of a spot welding head;

FIGURE 33 shows a suitable jig for receiving the parts;

FIGURE 34 is a plan view of a grid anode assembly apparatus with the various stations shown in outline;

FIGURE 35 is a perspective view showing jig feed and removal devices; and

FIGURE 36 is a plan view of a heater cathode assembly apparatus with the various stations shown in outline.

Figure 7:
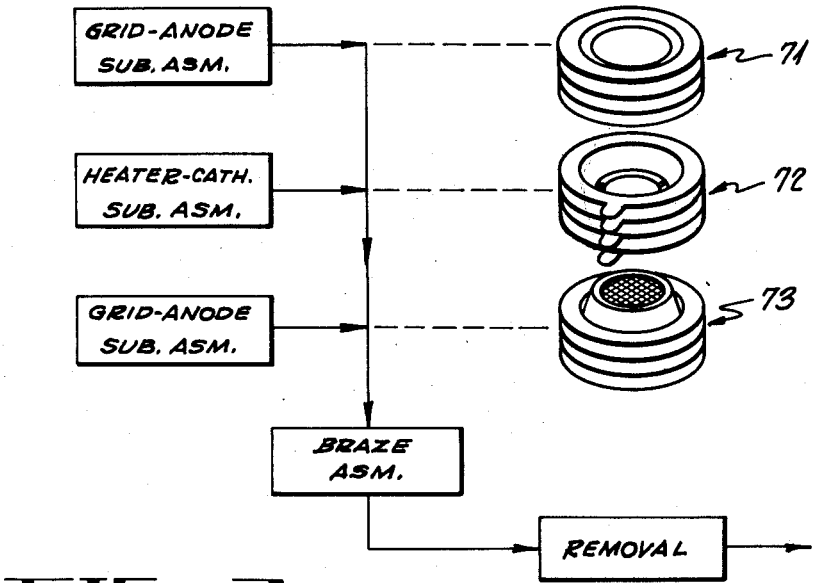
FIGURE 7 shows the final assembly of the various subassemblies to form a tube of the type shown in FIGURES 1 and 2.

The stacked ceramic vacuum tube illustrated in FIGURES 1 and 2 is a twin triode which includes seven tube elements, 2 anodes, 2 grids, 2 cathode discs, and a common heater. Metal cones and rings support the elements, and ceramic rings separate the cones and rings and form the side walls of the ceramic envelope. Two end discs complete the ceramic envelope. Tabs are provided for making electrical connection to the internal elements. The conical supports insure rigidity and in their nested relationship also provide a compact tube structure.

The first triode includes the ceramic end disc 11, braze ring 12, anode 13, braze ring 14, ceramic ring 15, braze ring 16, grid assembly 17, braze ring 18, ceramic ring 19, braze ring 20, cathode assembly 21, braze ring 22, ceramic ring 23, braze ring 24, a common heater assembly 25. The common heater assembly forms part of the second triode which includes the aforementioned tube elements in reversed order, thus braze ring 26, ceramic ring 27, braze ring 28, cathode assembly 29, braze ring 30, ceramic ring 31, braze ring 32, grid assembly 33, braze ring 34, ceramic ring 35, braze ring 36, anode 37, braze ring 38, and ceramic end disc 39.

The parts 11—20 and 30—39 are identical but assembled in reverse order. They may each be assembled by a grid-anode assembly apparatus. The parts 21—29 form a heater cathode assembly and are stacked by a heater cathode assembly apparatus. Two grid-anode assemblies and a heater-cathode assembly are then assembled in a final assembly apparatus and the various parts sealed to form the tube.

Each of the sub-assemblies referred to above may, in turn, include other sub-assemblies. For example, the grid-anode assembly may be formed by assembling various parts together, one of which includes a grid assembly formed by a grid assembly apparatus.

In accordance with the present invention, the various parts which form the sub-assemblies and the main tube assembly are fed into a pick-up position which may comprise a nest or spindle or a like positioning means and transferred from the pick-up position to an associated jig by a transfer head which forms an assembly station. The transfer head picks up a part from a pick-up position to which the parts are individually and cyclically fed and deliver the parts to jigs which are cyclically disposed adjacent the transfer head. Means, for example, a rotary table carries a plurality of such jigs and sequentially and cyclically presents each jig to each of the transfer heads. Parts are placed in the jig in a predetermined order. The apparatus may also include means for uniting certain of the assemblage of the parts, for example, spot welding or brazing stations, and testing stations may be employed for inspection of the joining operation.

Referring to FIGURES 3–8, the steps (stations employed) in forming the various sub-assemblies and the final assembly are shown in diagrammatic form. In FIGURE 3, the steps in the formation of a grid assembly 17 are illustrated. Thus, a grid mesh assembly including a mesh 41 and washer 42 is placed in a jig at a first station. The jig is then indexed to a second station where a grid cone including a ring portion 43 and conical support 44 is placed in the jig in assembled relationship with the grid mesh. The next station spot welds the parts to form the grid assembly 17. The ring 43 may include a tab which in assembly extends outwardly from the tube, as illustrated in FIGURE 1, so that electrical connection may be made to the internal grid element.

Referring to FIGURE 4, the steps in forming a heater assembly are illustrated. The machine first brazes two heater rings 47 and 48, including tabs 49 and 51 respectively, to a ceramic ring 52. Thus, the transfer heads serve to transfer into a jig in sequence the heater ring 47, a brazing ring 53, a ceramic ring 52, another brazing ring 54, and the heater ring 48 into a jig. The assembled parts are then transferred to a brazing station which serves to braze together the various parts to form the assembly 56. Subsequently, a transfer head serves to place a heater coil 57 in the center of the ring with the ends of the heater coil in contact with the tabs 49 and 51. The ends are then spot welded to the tabs at a spot welding station. The completed assembly is then transferred to an inspection station. At the next station acceptable assemblies are removed.

Referring to FIGURE 5, the steps in forming a grid-anode assembly are schematically illustrated. The parts which form the grid-anode assembly are stacked in a jig. The sequence of stations is shown. The end disc 11 is placed in the jig at the first station followed by addition of brazing ring 12, anode 13, brazing ring 14, ceramic disc 15, braze ring 16, grid assembly 17, braze ring 18, ceramic ring 19, and braze ring 20 in subsequent stations. The jig with the assembled parts is then removed for use in the final assembly machine.

Referring to FIGURE 6, the steps in forming a cathode assembly are illustrated. A cathode assembly which has been previously formed and which includes a metal ring 61, a support cone 62 and a cathode wafer 63 is placed in a jig. Then, in sequence at respective stations are added braze ring 22, ceramic ring 23, braze ring 24, the common heater assembly 25, braze ring 26, ceramic ring 27, braze ring 28, and another cathode assembly 29.

Referring to FIGURE 7, the final assembly steps are illustrated. The final assembly apparatus includes stations which assemble a grid-anode sub-assembly 71, a heater cathode sub-assembly 72, and a second grid-anode sub-assembly 73. The assembly is then brazed in a vacuum to form the tube.

Figure 8:
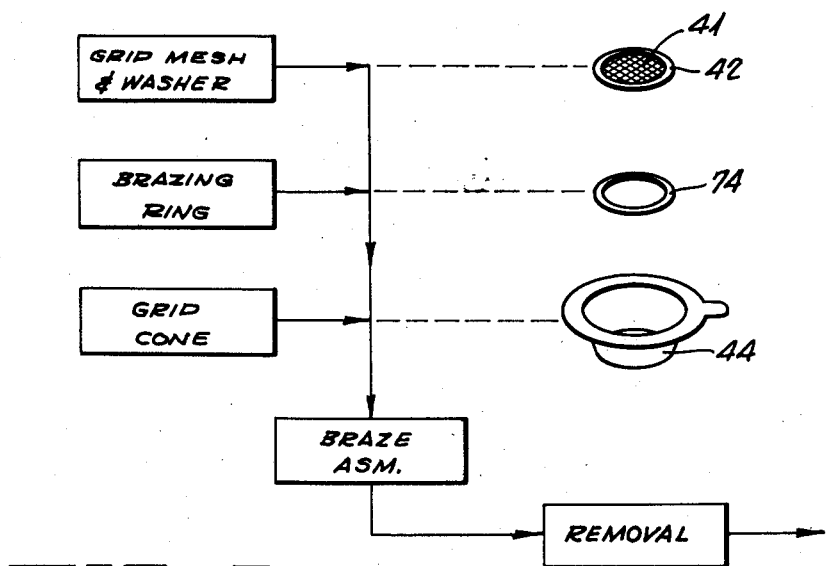
FIGURE 8 shows another method of making a grid assembly for a tube of the type shown in FIGURES 1 and 2.

Referring to FIGURE 8, an alternative method of forming a grid assembly is illustrated. In the embodiment shown, the grid mesh 41 including washer 42 is applied to a jig; a brazing ring 74 and then the grid cone 44 are applied. The assembled parts are then presented to a brazing station.

Referring to FIGURES 9, 10, 11 and 12, an assembly and processing apparatus is illustrated. The apparatus ilustrated is suitable for carrying out the steps described with respect to the formation of a brazed grid assembly (FIGURE 8). However, with the exception of certain stations, the apparatus will be identical to apparatus adapted to carry out other operations.

The apparatus includes a first transfer head designated generally by the reference numeral 81 which serves to pick up grids which are supplied by the manufacturer in the form of a grid mesh brazed to a washer, from a nest 82. The transfer head transfers the part to a jig 83 carried by a rotary table 84.

The rotary table is driven by a suitable Geneva drive 86, or equivalent, mounted on the base support 85. The Geneva drive is selected so that it rotates the table to present the jigs to the stations. The table remains stationary for a predetermined period of time and is then rotated to index the jig to the next station. In the illustrative example, the jig is presented to transfer head 88 which picks up a braze ring from an associated nest (not shown) and transfers the same into the jig. The table is then indexed to the next transfer head 89 which serves to apply the grid cone. Next, the jig is moved to a brazing station 91 (to be presently described in detail) where the parts are brazed together. The jig is then indexed to a transfer head 92 which removes the part from the jig and places the same in a suitable container or magazine.

Suitable control circuits are provided so that the table is rotated only after all of the stations have completed their operation for the given cycle.

As will be presently described, the transfer head, pick-up and jigs include orifices to which vacuum is applied to retain the parts. Thus, means are provided for supplying vacuum to the various stations. A main vacuum line 93 serves to create a vacuum within the stationary chamber 94 disposed above the rotary table. Referring to FIGURE 11, the chamber 94 is provided with a plurality of spaced ports 96 which communicate with solenoid valves 97 and pressure switches 98 to be presently described. Some of the ports communicate through a pipe 99 with the annular chamber 100. A vacuum slip ring arrangement 101 is provided whereby the pipes 102 associated with each of the jig holders 103 is in continuous communication with the chamber 100. Thus, the rotary table may rotate with respect to the vacuum system and yet vacuum is supplied to the jigs. The applied vacuum serves to hold the parts within the jigs. A vacuum gauge 104 may be associated with the system to give an indication of the pressure within the system.

The base support 85 may be supported by members 105, FIGURE 10. The members may include means for maintaining the same space from a floor of the receiving panels to provide a housing beneath the base for the vacuum pump, Geneva drive, and control equipment.

It will be apparent from the following discussion that although a rotary type indexing arrangement is described and preferred, the various stations may be arranged in line with a suitable indexing mechanism for indexing the jigs to each of the stations. However, a rotary type indexing table provides an advantageous arrangement whereby the positioning can be more accurate and the drives are simpler.

As described above, the various parts are individually removed from a pick-up position and transferred to jigs by transfer heads. The transfer heads are mounted on the support 85 by means of a bracket 111 (FIGURES 10 and 13) and are spaced to cooperate with the rotating table.

When the rotary table indexes a jig in front of the particular transfer head, the head operates to remove a part from a means for supplying parts thereto individually, for example, a pick-up nest, and transfer the part and the jig. The process is repeated each time a jig is indexed thereto.

The basic parts of the transfer head are the shuttle which is designated generally in FIGURES 13, 14 and 15 by the reference numeral 112 which carries the pick-up head 113, and rides back and forth either on tracks illustrated in FIGURES 13 and 14, or alternatively on rods (not shown). Pneumatically or hydraulically operated cylinders cause horizontal movement of the shuttle and pneumatically operated cylinders cause vertical movement of the pick-up head 113. A vacuum system is provided for releasably holding the parts to the pick-up head 113, as will be presently described.

A pneumatically or hydraulically operated system is preferred because it is capable of much smoother operation than a mechanical or electromechanical system. Furthermore, the system is adapted to more accurate positioning of the parts.

Referring to FIGURES 13–15, the transfer head assembly includes a support portion 114 which supports the various solenoid valves, a guide means 116 which serves to guide the shuttle in its movement, and the pick-up head 113 which picks up and delivers the parts. The guide means may, for example, comprise a pair of spaced rails 117 which are secured to the mounting means 114 and which are provided with spaced tracks 118 on which the rollers 119 ride. The rollers 119 serve to support the shuttle 112 for horizontal movement.

The shuttle is moved horizontally by the connecting rod 121 which is suitably secured to the shuttle portion 122 as, for example, by means of the bearings 123 to which the end of the connecting rod is secured. See FIGURES 13 and 15, although in the latter figure the rod 121 has been disconnected from the bearings. The connecting rod 121 is connected to a piston in double acting cylinder 124. A solenoid valve 126 is provided for supplying pressure to opposite ends of the cylinder to move the piston. The valve has its two ports connected to opposite ends of the cylinder by tubes 127 and 128. The solenoid valve is mounted on a support 129 which, in turn, is mounted on the support 114 and spaced therefrom by spacers 131.

A second solenoid valve 132 is mounted on a bracket 133 suitably secured to the base 114. The solenoid valve 132 is adapted to selectively apply pressure to the constant displacement transfer unit 136 through the tubes 137 and 138. Constant displacement transfer units are well known in the pneumatic art and will not be described further. It is apparent that the air transfer unit 136 may be replaced by flexible hoses which also would serve to give constant displacement although allowing the head 113 to move with respect to the stationary base portion.

Pressure is selectively applied by the solenoid valve 132 through the tubing 137, 138 and the constant displacement transfer unit 136 to the tubes 141 and 142 connected to supply pressure to opposite ends of the double acting cylinder 143 which drives pick-up head 113. A cap 144 encloses one end of the cylinder and O-rings 146 serving to provide a seal. A piston 147 is disposed within the cylinder and is connected to the connecting rod 148.

By selective application of pressure through the tubes 141 and 142, the piston is caused to move up and down. Attached to the piston rod 148 is a connecting arm 149 which has its other end connected to a rod 151. The rod 151 carries a collar 152 and a spring 153 is disposed between the collar 152 and the connecting arm 149 to spring load the combination whereby the rod 151 is urged downwardly. The upper end of the rod 151 carries a collar 154 which limits the downward travel. The lower end of the rod is threaded to the pick-up head 113 which is adapted to pick up parts as will be presently described.

Movement of the rod 151 is guided by a guide plate 156 which is supported from member 122 by spaced side plates 157 (FIGURE 13).

The solenoid valve 126 selectively applies pressure to the cylinder 124 to cause rectilinear horizontal movement of the shuttle 112. The solenoid valve 132 selectively applies pressure through the constant displacement transfer unit 136 to the cylinder 143 to cause rectilinear vertical movement of the pick-up head 113.

Referring to FIGURE 10, the pick-up head 113 is connected by a flexible line 161 to the solenoid valve 97 located on the apparatus, which valve selectively provides vacuum to the pick-up head to retain parts. A pressure switch 98 is provided whereby the vacuum in the line 161 may be monitored. The vacuum switch is connected in circuit with the main power source so that if vacuum fails, the machine is stopped.

Control circuits for controlling operation of the valves include three switches, shown in FIGURES 13, 14 and 15: 166 mounted on the base member 114; 167 mounted on the guide member 156; and 168 mounted on the shuttle. The switch 166 is operated by a spring loaded rod 171 which is mounted on the side of one of the guide rails. Normally, the rod is urged towards the switch to depress the plunger 172. As the shuttle rolls forward, the front roller strikes an abutment 170 which causes the rod to move to the right as viewed in FIGURE 14 to release the plunger 172. Similarly, when the shuttle travels to its rearmost position, the rear roller 119 strikes the abutment 173 to cause the same to rotate and again release the plunger 172. Between the extremes of travel the switch is activated.

The switch 167 is operated by the adjustable rod 174. Thus, as the connecting arm 149 moves downwardly with the head, the plunger of the switch 167 is released to activate the switch. Operation of the switch 168 is by the adjustable plunger 176 which is adapted to activate the switch when the pick-up head moves downwardly a predetermined distance.

Operation of the transfer heads is more clearly understood with reference to FIGURES 16A–B to 21A–B. Part A of the figures shows in outline the position of the various portions of the transfer head illustrated in FIGURES 13–15. Part B of the figures is a schematic diagram showing the pressure connections and activation of the switches.

FIGURES 16A–B show the transfer head in readiness to undergo a cycle of operation. The shuttle is in its rearward position and the pick-up head is in its uppermost position over the parts presenting means. Retracting pressure is applied to the double acting cylinders 124 and 143 and no vacuum is applied to the pick-up head. Thus, the apparatus can be turned on and off without affecting operation of the apparatus. When the apparatus is turned on and the rotating table indexes a jig to the transfer head, a signal is applied to operate the solenoid valve 132 so that pressure is applied to the double acting cylinder 143 to move the pick-up head down into engagement with the article presenting means, FIGURES 17A–B. As the head seats in the article presenting means, the connecting arm 149 strikes the interlock switch 168 which, in turn, actuates the solenoid valve 97 to apply vacuum to the pick-up head. This serves to hold the part on the head. The interlocked switch 168 also serves to actuate the solenoid valve 132 whereby pressure is applied to the lower end of the double acting cylinder 143, moving the pick-up head upwardly with the retained part, FIGURES 18A–B. Solenoid valve 132 is operated when the switch 167 is struck by the connecting arm 149. The interlock switch 167 also serves to energize the solenoid valve 126 to apply pressure to one end of the double acting cylinder 124. This moves the shuttle out along the guide means until the pick-up head is disposed above the jig on the rotating table 84. When the transfer head reaches the end of its travel (FIGURE 19B), the front roller strikes the abutment 170 to open the switch 166 which actuates solenoid valve 132 and applies pressure to the upper end of the double acting cylinder 143. This causes the pick-up head to move down placing the part in the jig, FIGURES 20A–B. As the pick-up head moves down to deposit the part in the jig, the connecting arm 149 strikes the switch 168 which then de-energizes the solenoid valve 97 breaking the vacuum and releasing the part, and de-energizes the solenoid valve 132, reversing the pressure on the cylinder 143, moving the head up to the next position, FIGURES 21A–B. As the transfer head moves up towards the end of its travel, the connecting arm 149 strikes the interlock switch 167 on the guide member 156. This de-energizes the solenoid valve 126, applying pressure to the other end of the double acting cylinder 124, moving the shuttle back to the position shown in FIGURES 16A–B. The transfer head is then in readiness for the next cycle of operation which is initiated by indexing a new jig to the transfer head. As will be clearly apparent, the foregoing cycle of operation is directed to the cycle of operation in which parts are removed from an article presenting station and transferred into a jig for assembly. A transfer head for transferring parts from a jig into an associated storage magazine or storage bin is similar to that just described with the exception that operation of the valve 97 is reversed. When the rotary table is moved to index the jig to the transfer head, the shuttle moves forward, the pick-up head moves down into the jig, vacuum is applied as the head engages the part in the jig, and the part is then lifted, the transfer head moves back until it is over a storage bin or magazine. It then moves down to place the part in the storage magazine or bin. When it reaches its lowermost position, the vacuum is removed from the pick-up head to release the part. The pick-up head then moves up to its starting position, and the apparatus is in readiness for its next cycle of operation.

If in the pick-up positions, the head fails to pick up a part within a half a second, a vacuum switch 96 is provided which will interrupt the main control circuit at the end of the cycle thus preventing recycling of the rotary table until the trouble is rectified.

As described above, the parts are, in general, supplied to the transfer heads by a supply station which can comprise a pick-up nest or a spindle. Parts which do not have tabs require relatively simple nests. When parts have tabs, the pick-up nest includes means for aligning the tabs so that the assembled tube will have the tabs lying in the proper relationship.

Referring particularly to FIGURES 22 and 23, a suitable indexed pick-up nest employed in a pick-up station is shown. The nest includes a lower plate 175 which has a channel 177. The channel connects the pick-up nest 178 to the delivery chute 179 to which parts are individually fed by suitable means as, for example, of the type to be presently described. The part slides in from the chute and the momentum of the part will serve to carry the part along the channel and into the nest 178. A plurality of apertures 181 is provided and air under pressure may be supplied through the line 182 to urge the parts along the channel into the nest. The chute communicates with the cylindrical opening 183 which forms the side walls of the nest. The cylindrical opening receives a plunger 184 which is urged upwardly by means of the spring 186. The set screw 187 riding in the slot 185 limits upward movement of the plunger 184. The spring loaded plunger 184 provides compliance whereby the pick-up head moves the plunger slightly downwardly to assure good contact between the pick-up head and the part to assure that the vacuum will hold the part.

As described above, the nest may include an indexing mechanism. Referring to FIGURE 22, the indexing mechanism may comprise an air actuated cylinder 188 which operates in conjunction with the rod 189 to move the link 191 which, in turn, rotates the arm 192 to move the actuating arm 193. The actuating arm 193 is connected to sleeve 194 by a pin (not shown), and arm 193 serves to rotate the sleeve 194 which encircles the plunger 184 and frictionally drives the same. The plunger includes an abutment 195 which abuts the outwardly extending tabs and rotates the part until the tab strikes a positioning abutment 196 in the opening 183. The sleeve can then continue to rotate without further rotation of the plunger part. Thus, there is provided means for yieldably presenting properly indexed parts to the transfer head.

As previously described, the parts are individually fed to the pick-up nest in cyclic relationship to rotation of the rotary table. Suitable electrical means which may include switches operates in conjunction with operation of the head to activate the solenoid valve 201, FIGURE 24, which, in turn, serves to operate the piston 202 within the cylinder 203. Operation of the piston selectively moves the stops 204 and 205. Thus, the forward stop 204 is lifted before the back stop 205 to thereby release the part retained between the two stops. Subsequently, the forward lever is lowered while the back lever is lifted to allow a part to be moved between the two. The cycle of operation is then repeated.

A photoelectric means which includes a light source 206 and a pick-up device 207 may be provided for controlling feed to the release chute 208. Thus, when the chute is filled, the photoelectric means will serve to stop a feeding mechanism associated therewith.

As previously described, the pick-up station may comprise a spindle for supplying the very thin brazing rings. A spindle type feeding mechanism is illustrated in FIGURE 25. The mechanism comprises a spindle 211 which slidably receives a collar 212 upon which the brazing rings are mounted. A stack of brazing rings is shown in outline by the dash line 213. The spindle is connected to a spool-like member having an upper collar 214 and a lower collar 215 interconnected by a handle 216. The parts thus far described are adapted to be removed from the remainder of the feeding mechanism so that when the supply of brazing rings on spindle 211 has been exhausted, the empty spindle can be removed by handle 216 and replaced with a fully loaded spindle equipped with its own spool-like member including collars 214, 215, and its own handle 216.

The means for releasably holding a spindle in place comprise a block 209 which is permanently attached to the frame of the feeding mechanism and which has an upper pair of arms 219 and a lower pair of arms 220. Each pair of arms forms a V-shaped notch into which the lower end of spindle 211 fits. Only one of the upper arms and one of the lower arms are visible in FIGURE 25. The spindle is held in contact with arms 219 and 220 by means of a movable block 225 which has a V-shaped notch facing the notches formed by arms 219 and 220. Block 225 is pivotally connected to an arm 210 which is, in turn, connected to the frame of the feeding mechanism by a pivot pin (not shown) so that the arm 210 and block 225 can swing to the right in FIGURE 25 and release the spindle. There is a conventional toggle (not shown) for releasably holding the block 225 in the closed position shown in FIGURE 25. The block 209 is provided at its upper end with a pin 218 which fits into a U-shaped slot 217 in the collar 214 to assure that the spindle will be properly positioned between the blocks 209 and 225.

The purpose of the feeding mechanism is to elevate the stack of brazing rings 213 as the top rings are removed, and the mechanism for accomplishing this purpose will now be described. The feeding mechanism has a post 222 on which a sleeve 228 is slidably mounted for vertical movement. Sleeve 228 is provided with two arms 221 which project to the right on opposite sides of collar 212, only one of the arms being visible in FIGURE 25. Each of the arms has a slot into which the rim on collar 212 fits when the spindle is inserted so that when sleeve 228 moves upwardly, it will carry collar 212 with it.

Sleeve 228 is driven upwardly by a line 223 which may be in the form of a spring wound onto a reel 224. Line 223 passes around a reel 226 which acts as a brake against upward movement of the line. Brake 226 is controlled by a switch 233 which has an actuating arm 232. Arm 232 is operated by a pin 231 which is radially attached to a rod 227 slidably received in the center of spindle 211. The pick-up head 113 which is used with the spindle type feeding mechanism is provided with a central bore which fits over spindle 211, the depth of the bore being such that the inner end of the bore engages and depresses rod 227 as the head 113 moves down. The upper end of spindle 211 is slotted to form four posts 229 instead of having a full 360° periphery. The reason for this structure is to reduce friction between the top brazing ring being removed and the spindle 211.

Thus, when the pick-up head 113 is lowered to pick up a ring from stack 213, it moves the internal rod 227 up and with it the pin 231 downwardly to depress arm 232 of the switch 233 to operate the same. When activated in this manner, switch 233 releases brake 226, and spring reel 224 is free to raise sleeve 228 which carries collar 212 with it. Thus, the brazing rings 213 are urged upwardly against the pick-up head. As the pick-up head moves upwardly, the switch 233 is activated to apply the brake 226, preventing the discharge of parts.

Referring again then to FIGURE 9, the first three stations 81, 88 and 89 are transfer heads of the types which transfer parts from nests and spindles to jigs which are cyclically and sequentially presented thereto by the rotating table 84. The fourth station is a brazing station 91. Two types of brazing stations can be used, one type being shown in FIGURES 26A and 26B, and the other type being shown in FIGURES 27 and 28.

The brazing station shown in FIGURES 26A and 26B is designed to accomplish conventional melt-type brazing, whereas the station shown in FIGURES 27 and 28 is designed to accomplish the more recent pressure-type braze in which bonding is achieved by the application of high pressure at temperatures below the melt temperatures of the metals to be joined.

Referring first to FIGURES 26A and 26B, the melt-type brazing staion comprises an inductive heater coil 235 contained within an inverted jar 236. In the position shown, the brazing head is in readiness for operation. The solenoid valve 252 is positioned so that fluid flow to cylinder 251 holds piston 254, and thus jar 236 elevated. Also, solenoid valve 253,, which has a low-flow and high-flow position, is set in the low-flow position. An inert gas such as hydrogen is admitted by valve 253 to the jar 236, and in the low-flow position only enough gas is admitted to keep the jar purged of air.

When the indexing table has indexed, the solenoid valve 252 is energized to reverse the flow to cylinder 251, causing jar 236 to be lowered over the jig 103. When the rim of the jar is sealed against the table 84, a switch (not shown) is activated and connects power to the heating coil 235 for a predetermined time cycle. During the brazing cycle, valve 253 is in the high-flow position. At the end of the brazing cycle, the solenoid valve 252 is returned to the position shown in FIGURE 26B and the jar 236 is raised. Raising of the jar activates a switch (not shown) which signals the indexing table controls to move the table one station and bring the next jig under the brazing jar 236.

Referring now to FIGURES 27 and 28, the pressure-type brazing station comprises an induction heating coil 235' and a jar 236'. The jar 236' in this embodiment does not seal against table 84. Instead, a tunnel 238, shown only in FIGURE 28, seals against the table by means of the flexible rim 239. The tunnel does not move with table 84 and can be attached to any convenient stationary part. For example, the tunnel could be attached to bracket 247 in FIGURE 27 by means of connecting member 240. The tunnel is elongated at right angles to the plane of FIGURE 28 so that it covers two jigs 83 at the same time. Referring to FIGURE 9, the tunnel would cover the jig under brazing station 91 and the jig between stations 91 and 92. The reason for using the tunnel is to speed the operation; that is, after the parts in one jig are brazed, the table can move immediately to the next position where the parts in said one jig can cool in a controlled atmosphere in the tunnel while the next jig is being brazed. Without the tunnel, the table would have to remain stationary both for the brazing time and the cooling time. The tunnel is connected to an inert gas source in the manner described for FIGURES 26A and 26B, and, of course, the tunnel has swinging doors at each end to provide for passage of the jigs. The top of tunnel 238 is provided with an aperture which receives jar 236' for vertical movement.

The jar 236' and coil 235' are raised and lowered by a cylinder and piston unit 242 controlled by a solenoid valve 241. The jar and coil are mounted on a piston rod 244 guided in a bearing 246 in a bracket 247. Pressure-type brazing requires very high pressure and, therefore, a pressure plunger 237 is carried by a fitting 245 attached to piston rod 244. As shown best in FIGURE 28, plunger 237 is free to wobble slightly in fitting 245 until full contact has been made with the parts in jig 83 in order to accommodate any possible misalignment between the center lines of the piston rod and jig. Parts 83, 236', 237, 238 and 245 are made of high alumina ceramic so that they will not be heated by coils 235', and in the core of 237 and 245 still be strong enough to apply pressure.

In view of the high pressures involved, the feature which makes pressure-type brazing possible is a counter-pressure mechanism without which table 84 would be deflected and the close tolerances in the system would be damaged. The counter-pressure mechanism comprises a pressure bar 249 which bears against the bottom of table 84 and is connected at its ends to the piston rods of two cylinders and piston units, one of the units being shown at 243 in FIGURE 27. The necessity for a pair of such units in the example shown is that the drive means 248 for the Geneva drive interferes with the positioning of a single cylinder directly beneath the jig. The cylinder and piston units 248 are rigidly fixed to the frame of the assembly apparatus. Both of the units are of the same size and are connected to the same fluid pressure source so they both exert the same force on bar 249. In addition, units 243 are connected to the same fluid pressure source as cylinder and piston unit 242, and the size of units 242 and 243 is designed so that the force exerted by bar 249 will counteract the force exerted by plunger 237.

Operation of the brazing station is in response to movement of table 84. As the table is indexed to present a jig under plunger 237, the solenoid valve 241 is energized to provide pressure to the upper portion of cylinder 242 and the lower portion of cylinder 243. When plunger 237 moves down to apply pressure, a switch (not shown) is activated and connects power to the heating coil 235' for a predetermined time cycle. The coil heats the brazing rings and adjacent metallic parts of the tube to a temperature below the melting temperature, and the combination of the pressure and temperature causes good bonding as is well known in the art. After the brazing operation which has a predetermined preset time, the solenoid valve 241 is energized in the opposite direction and causes plunger 237 and bar 249 to be retracted. The table 84 is then indexed to present another jig under the brazing station.

Operation, as shown in FIG. 8, of the apparatus shown in FIGURE 9 will now be described. A preloaded chute containing grid washer assemblies 41, 42 is placed in a release mechanism of the type described with respect to FIGURE 24. The escape mechanism is activated by the indexing table and cyclically releases one part at a time into the pick-up nest where it is picked up by the transfer head 81 and deposited in a jig indexed to that station.

The next station 88 delivers brazing rings 74 from a spindle (FIGURE 25) to the transfer head which then places them in the jig. The next station 89 includes a vibratory feeder (not shown) which feeds grid cones 44 into a temporary storage chute of the type previously described with respect to FIGURE 24 where they are delivered, one at a time, into the pick-up nest previously described with respect to FIGURE 22. The transfer head picks them up and deposits these into the jig. The stacked parts (jig) are then indexed to the brazing station, as described with reference to FIGURES 26, 27 and 28, where the parts are brazed together. The jig then travels to a take-off station 92 where a transfer head lifts the brazed assembly from the jig and drops it into a chute (not shown) which terminates in a storage container (not shown). When the container is full, the assemblies are removed, treated and placed in readiness for the final assembly step described with reference to FIGURE 7.

Referring to FIGURE 29, there is shown an apparatus suitable for forming a heater assembly. The sequence of stations is indicated in FIGURE 4, and the apparatus employs stations 281 through 290, in that order. This apparatus first brazes two heater rings each with a tab on the inside to a ceramic ring. Next, a heater coil is placed in the center of the rings and its ends are spot welded to the tabs at station 288, as hereinafter described in detail. The assembled parts are inspected at station 289 and acceptable assemblies are loaded into a magazine which acts as a feeder for a heater-cathode assembly machine.

A suitable spot welding station is shown in FIGURES 31 and 32. A piston rod 261 moves the head 262 through a lever arrangement 263. The rod is driven by a piston contained in the pneumatic cylinder 264. The head 262 is more clearly shown in FIGURE 32 and includes at least two spaced spot welding tips 266 which are adapted to contact and spot weld the ends of the heater coil to the tabs 49 and 51. The spot welding apparatus shown in FIGURES 31 and 32 includes a plurality of buss bars 268 which serve to provide electrical current to the spot welding tips 266. In the instant example, only a single pair of buss bars 268 is employed to energize a pair of tips 266. However, as will be presently described, the spot welding apparatus is also adapted to form more than two spot welds to spot weld rings to other parts as a substitute for a brazing operation and in such instance all of the bus bars 268 may be employed.

When employing large currents, it is desirable to provide a return electrical path through the table. Thus, a contact arrangement 271 is provided to make contact with the commutator 272 carried by the lower part of the table. Contact is made by energizing a cylinder (not shown) which drives a piston (not shown) to urge the contacts tightly against the table as the welding head moves down.

Operation of the spot welding station is substantially as follows. As the jig is indexed under the spot welding head, a signal is supplied to control a solenoid operated valve which supplies pressure to the cylinder 264 to urge the head 262 downwardly against the work piece. The contact 271 is urged against the cummutator 272. As soon as contact is made to the work piece, a switch is energized which serves to supply current through the spot welding tips for a predetermined period of time to form a suitable spot weld. At the termination of the spot welding operation, a signal is supplied to the control circuit, the head is raised and the contact retracted. The table is then ready for indexing to the next station.

The inspection station which follows includes a head similar to that described above. However, the large buss bars 268 are not required. Again, the head is lowered and contact is made with the tab portions. Suitable circuit checking means checks the previous spot weld. If the weld is not satisfactory, it forms a signal which causes the next station to reject the part.

A description of the assembly apparatus shown in FIGURE 29 can now be more clearly understood. Station 281 individually transfers a heater ring from the nest to a jig; station 282 transfers a brazing ring; station 283, a ceramic ring; station 284, a brazing ring; and station 285, a heater ring. Station 286 is a brazing station of the type previously described with reference to FIGURES 27 and 28 and serves to braze together the various parts to form a sub-assembly. The jig is then indexed to the next transfer head 287 which transfers a heater into the jig with the heater terminals overlying the tabs 49 and 51 formed in the heater rings. The jig is then sequenced to station 288 where a spot welder welds the ends of the heaters to the tabs. The jig is then indexed to the spot weld inspection station 289. If the resistance measured between these two points is not within desired limits, the apparatus is preset so that the next station 290 will reject the assembly.

Station 290 contains the take-off transfer head and serves to remove the parts from the jig and load the parts into a magazine (not shown). The head picks up the assembly from the jig, and drops it into a chute. The chute delivers the assembly to the magazine loader unless it has received a signal from the preceding station indicating that the assembly should be rejected, in which case the chute swings out of the way and the assembly drops into a reject bin.

Referring to FIGURE 30, there is shown an alternate grid assembly apparatus in which the grid mesh is spot welded to the cone as shown in FIGURE 3 rather than brazed, as shown in FIGURE 8 and previously described. The spot welding is accomplished by an eight point spot weld tool of the type described with reference to FIGURES 31 and 32.

Thus, station 291 feeds a grid mesh assembly, and transfer station 292 includes a vibratory feeder 293 which feeds parts and an individual parts release mechanism 294 of the type previously described with reference to FIGURE 24 to individually feed parts into the chute 295 for delivery to the pick-up nest. The transfer head serves to transfer a grid cone into the jig. The next station is a multi-point spot welding station 297 which is adapted to spot weld the grid mesh to the cone. The station 298 is a take-off station which takes the parts off and delivers them for loading into a magazine or into a storage bin.

Having thus described the sub-assembly machine, the final assembly machine will now be described. It will be recalled that the sub-assembly machines consist of the grid assembly machine shown in FIGURE 9 and the alternate in FIGURE 30, and the heater assembly machine shown in FIGURE 29. The final assembly machines consist of a grid anode assembly machine shown in FIGURE 34, a heater cathode assembly machine shown in FIGURE 36, and a second grid anode assembly machine, which is substantially the same as the grid anode machine in FIGURE 34.

Referring to FIGURE 34, the grid anode assembly machine is schematically illustrated in top plan view. The machine is basically the same as the previously described assembly machines except that it does not include any brazing or welding stations, has a greater number of stations, and has means for feeding jigs onto table 84 and removing jigs from the table. In FIGURE 34 an elevated, stationary shelf 301 carries the various types of feeding mechanisms which have been previously described. The stations 340 through 349 are plan outline views of the transfer assembly shown in FIGURE 14 but with the shuttle 112 in retracted position.

In the sub-assembly machines, the jigs 83 remain on the rotary table. The transfer heads deposit various parts in the jigs; the parts are brazed or welded together to form a subassembly, and the last transfer head removes the sub-assembly from the jig. In the final assembly machines, the jigs do not remain on the rotary table; instead, they are fed onto the table, loaded by the transfer heads, and then removed from the table. A suitable jig is shown in FIGURE 33 and comprises a base portion 302 with a cylindrical parts receiving portion 303. Slots 304 are provided for locating the outwardly extending tabs in position.

The empty jigs are individually fed onto the rotary table 84 by means of a feeder 311, the jigs travelling in the direction shown by the arrow in FIGURE 35. The feeder includes a reciprocating feed mechanism 312 having fingers 313 engaging the back of the base 302 of the individual jigs and urging them forward. When the jigs reach the upper position, a finger 314 abuts the back of the base 302 and urges the jig into the jig holder 316. Finger 314 is carried on a feed mechanism 315 which moves back when mechanism 312 moves forward, and vice versa. Jig holder 316 is adapted to receive and position the base 302 with the projecting portion 317 seated in the accommodating slot 318. Operation of the jig feed mechanism is in synchronism with operation of the machine whereby jigs are individually fed into the jig holder as the rotary table 84 is rotated and indexed to the various stations.

Returning to FIGURE 34, the grid anode assembly macchine is designed to assemble the elements shown in FIGURE 5. The empty jigs are fed onto the table 84 by mechanism 311. Station 340 delivers a ceramic end disc 11 to the jig. After all of the tube parts are assembled in the jig, the jig will be turned upside down to remove the tube, and disc 11 will be on top as shown in FIGURE 2. Accordingly, it will be obvious that the machine in FIGURE 34 will load parts 11 through 20 into the jig in the order shown in FIGURE 5 but that the parts 11, 13 and 17 must be turned upside down from the position shown in FIGURE 5. It is believed apparent that stations 340 through 349 will load parts 11 through 20, respectively, with the result that brazing ring 20 is the top element in the jig when it reaches the removal position where it is in line with a fluid actuated plunger unit 330. Plunger 330, which is cyclically operated with motion of the table, abuts the loaded jig and urges the same onto the take-off chute 331, as shown enlarged in FIGURE 35.

Chute 331 of the grid anode machine in FIGURE 34 is connected to the feeding mechanism 311 of the heater cathode assembly machine in FIGURE 36. The heater cathode machine is designed to assemble the elements shown in FIGURE 6, and the machine stations 321 through 329 load parts 21 through 29, respectively, and in that order, into the jigs which already contain a grid anode sub-assembly 11 through 20. As in the case of FIGURE 5, the parts 21 and 29 must be turned upside down from the position shown in FIGURE 6. Thus, after the jig passes station 329, the top element in the jig is the cathode 29. When the jig reaches the plunger unit 330 in FIGURE 36, it is ejected into a take-off chute 331, as described for FIGURE 34.

Chute 331 of the heater cathode machine is connected to the feeding mechanism 311 of a second grid anode assembly machine which is identical to the machine shown in FIGURE 34, except that it feeds the elements in the reverse order from that shown in FIGURE 5. Referring again to FIGURE 34 and now considering it as the second grid anode machine, station 340 will feed brazing ring 30 (FIGURE 2); station 341 will feed ceramic ring 31; station 342 will feed brazing ring 32; station 343 will feed grid assembly 33, inverted from the position in FIGURE 2; station 344 will feed brazing ring 34; station 345 will feed ceramic ring 35; station 346 will feed brazing ring 36; station 347 will feed anode 37, inverted from the position in FIGURE 2; station 348 will feed brazing ring 38; and station 349 will feed ceramic end disc 39, inverted from the position in FIGURE 2. Thus, after the jig passes station 349, all of the elements for a complete tube will be stacked in the jig. When the jig reaches the plunger unit 330, it is ejected into the take-off chute 331.

Chute 331 of the second grid anode machine goes to a conventional vacuum brazing furnace (not shown) where the loose elements are brazed together to form a completed tube as shown in FIGURE 1.

I claim:

1. An assembly apparatus of the type adapted to assemble articles comprising a plurality of spaced stations, article receiving means, a movable table serving to carry said article receiving means, means for periodically moving said table whereby the article receiving means are sequentially indexed to said stations, adjacent ones of said stations including article presenting means, said adjacent stations including an article transfer means comprising a shuttle and a pick-up head carried thereby, means for guiding said shuttle between first and second horizontal positions, and means for guiding said head for vertical movement between first and second vertical positions, means supporting said transfer means between said article receiving and presenting means at an elevation such that said pick-up head in its lowered positions is above said receiving and presenting means respectively at opposite ends of the travel of said shuttle, whereby said pick-up head is moved for cooperation with the receiving means in one horizontal position of the shuttle and with said article presenting means in the other horizontal position of the shuttle whereby said pick-up head moves vertically to remove parts from the article presenting means and deposit parts in the article receiving means.

2. An assembly apparatus of the type adapted to assemble articles comprising a plurality of spaced stations, article receiving means, a rotary table for carrying and indexing said article receiving means sequentially to said stations, article presenting means associated with adjacent ones of said stations, an article transfer means associated with said adjacent stations and comprising a shuttle adapted to carry a pick-up head, means for guiding said shuttle for rectilinear motion between first and second horizontal positions, means carried by said shuttle for guiding said pick-up head for rectilinear movement between first and second vertical positions, means supporting said transfer means between said article receiving and presenting means at an elevation such that said pick-up head in its lowered positions is above said receiving and presenting means respectively at opposite ends of the travel of said shuttle, pneumatic means for moving said shuttle between said first and second horizontal positions, and pneumatic means for moving said pick-up head between said first and second vertical positions, and means for selectively applying pressure to said pneumatic means whereby said transfer assembly is moved to pick up and deposit articles from the article presenting means into the article receiving means.

3. An apparatus of the type adapted to assemble articles comprising a plurality of spaced stations, article receiving means, a rotary table for carrying and indexing said article receiving means sequentially to said stations, adjacent ones of said stations including article presenting means, each of said adjacent stations also including an article transfer means comprising a shuttle, a pick-up head carried by said shutle, means for guiding said shuttle for rectilinear movement between first and second horizontal positions, means carried by said shuttle for guiding said head between first and second vertical positions, means supporting said transfer means between said article receiving and presenting means at an elevation such that said pick-up head in its lowered positions is above said receiving and presenting means respectively at opposite ends of the travel of said shuttle, means for moving said shuttle between first and second horizontal positions, means for moving said pick-up heads between first and second vertical positions, means for selectively energizing said shuttle and head moving means whereby the shuttle and head are cyclically moved to pick up parts from the article presenting means and transfer and deposit the parts in the article receiving means, and means for selectively applying vacuum to the pick-up head to thereby selectively retain and release parts.

4. An article transfer assembly including a shuttle, means for guiding said shuttle for rectilinear movement between first and second horizontal positions, a pick-up head carried by said shuttle, and means carried by said shuttle for guiding said pick-up head for rectilinear movement between first and second vertical positions in each of said first and second horizontal positions of the shuttle.

5. An article transfer assembly including a shuttle, means for guiding said shuttle for rectilinear movement between first and second horizontal positions, means for moving said shuttle between first and second horizontal positions, a pick-up head carried by said shuttle, means for guiding said pick-up head for rectilinear movement between first and second vertical positions in each of said first and second horizontal positions, and means carried by said shuttle for moving said pick-up head between said first and second vertical positions.

6. An article transfer assembly including a shuttle, means for guiding said shuttle for rectilinear movement between first and second horizontal positions, pressure actuated means for moving said shuttle between first and second horizontal positions, a pick-up head carried by said shuttle, pressure actuated means for guiding said pick-up head for rectilinear movement between first and second vertical positions in each of said first and second horizontal positions, and means carried by said shuttle for moving said pick-up head between said first and second vertical positions.

7. An article transfer assembly including a shuttle, means for guiding said shuttle for rectilinear movement between first and second horizontal positions, pneumatic means for moving said shuttle between first and second horizontal positions, a pick-up head carried by said shuttle, pneumatic means for guiding said pick-up head for rectilinear movement between first and said vertical positions in each of said first and second horizontal positions, and means carried by said shuttle for moving said pick-up head between said first and second vertical positions.

8. An article transfer assembly including a shuttle, means for guiding said shuttle between first and second horizontal positions, a selector adapted to be activated by movement of said shuttle between said first and second horizontal positions, a pick-up head carried by said shuttle, means carried by said shuttle for guiding said pick-up head for rectilinear movement between first and second vertical positions, and selector means carried by said shuttle and adapted to be activated when the pick-up head is in its first and second vertical positions.

9. An apparatus of the type adapted to assemble articles comprising a plurality of spaced stations, article receiving means comprising a cup-shaped jig having at least one longitudinal groove on its inside wall, a rotary table for carrying and indexing said article receiving means sequentially to said stations, adjacent ones of said stations including article presenting means, each of said adjacent stations also including an article transfer means comprising a shuttle, a pick-up head carried by said shuttle, means for guiding said shuttle for rectilinear movement between first and second horizontal positions, means carried by said shuttle for guiding said head between first and second vertical positions, means supporting said transfer means between said article receiving and presenting means at an elevation such that said pick-up head in its lowered positions is above said receiving and presenting means respectively at opposite ends of the travel of said shuttle, means for moving said shuttle between first and second horizontal positions, means for moving said pick-up head between first and second vertical positions, means for selectively energizing said shuttle and head moving means whereby the shuttle and head are cyclically moved to pick up parts from the article presenting means and transfer and deposit the parts in the article receiving means, means for selectively applying vacuum to the pick-up head to thereby selectively retain and release parts, and at least one of said presenting means comprising means for rotating the article to a position such that an outwardly projecting tab on the article is oriented in the same direction as the groove in said jig.

10. Apparatus as claimed in claim 9 in which said presenting means comprises a generally cylindrical housing, a plunger in said housing, a spring in said housing biasing said plunger upwardly toward said pick-up head, a stop limiting upward movement of said plunger, said pick-up head in its downward position being low enough to depress said plunger and article thereon against the force of said spring, and said article rotating means comprising cooperating abutments on said housing and plunger and slip-friction means for rotating said plunger.

11. An apparatus of the type adapted to assemble articles comprising a plurality of spaced stations, article receiving means, a rotary table for carrying and indexing said article receiving means sequentially to said stations, adjacent ones of said stations including article presenting means, each of said adjacent stations also including an article transfer means comprising a shuttle, a pick-up head carried by said shuttle, means for guiding said shuttle for rectilinear movement between first and second horizontal positions, means carried by said shuttle for guiding said head between first and second vertical positions, means supporting said transfer means between said article receiving and presenting means at an elevation such that said pick-up head in its lowered positions is above said receiving and presenting means respectively at opposite ends of the travel of said shuttle, means for moving said shuttle between first and second horizontal positions, means for moving said pick-up head between first and second vertical positions, means for selectively energizing said shuttle and head moving means whereby the shuttle and head are cyclically moved to pick up parts from the article presenting means and transfer and deposit the parts in the article receiving means, means for selectively applying vacuum to the pick-up head to thereby selectively retain and release parts, and said article presenting means comprising an upwardly extending spindle and a collar slideably positioned on the spindle, whereby ring-shaped articles may be loaded on said spindle and supported by said collar, means for raising said collar on said spindle, and means activated by downward movement of said pick-up head for actuating said raising means.

References Cited in the file of this patent
UNITED STATES PATENTS

| | | |
|---|---|---|
| 1,735,609 | Frederick | Nov. 12, 1929 |
| 2,402,204 | Phelan et al. | June 18, 1946 |
| 2,507,072 | Weber | May 9, 1950 |
| 2,551,244 | Clark et al. | May 1, 1951 |
| 2,794,563 | Daines et al. | June 4, 1957 |
| 2,853,769 | Stahl | Sept. 30, 1958 |
| 2,896,314 | Godwin et al. | July 28, 1959 |